(12) United States Patent
Williams et al.

(10) Patent No.: US 6,281,970 B1
(45) Date of Patent: Aug. 28, 2001

(54) AIRBORNE IR FIRE SURVEILLANCE SYSTEM PROVIDING FIRESPOT GEOPOSITIONING

(75) Inventors: John H. Williams, Thousand Oaks; Guy F. Cooper, Ventura, both of CA (US)

(73) Assignee: Synergistix LLC, Thousand Oaks, CA (US)

( * ) Notice: Subject to any disclaimer, the term of this patent is extended or adjusted under 35 U.S.C. 154(b) by 0 days.

(21) Appl. No.: 09/267,513

(22) Filed: Mar. 12, 1999

Related U.S. Application Data

(60) Provisional application No. 60/077,821, filed on Mar. 12, 1998.

(51) Int. Cl.[7] ............................ G01B 11/26; G08B 17/12; G01J 5/02
(52) U.S. Cl. ............................... 356/141.4; 250/339.15; 250/334; 340/578; 356/141.5; 701/214
(58) Field of Search ............................ 356/141.2, 141.5, 356/141.4; 702/150, 151, 152, 153; 701/214, 223; 250/342, 332, 334, 339.15; 348/144; 244/3.16; 340/578

(56) References Cited

U.S. PATENT DOCUMENTS

| | | | |
|---|---|---|---|
| 1,990,494 | 2/1935 | Murphy | 250/11 |
| 4,914,734 | * 4/1990 | Love et al. | 342/64 |
| 4,949,089 | 8/1990 | Ruszkowski, Jr. | 342/52 |
| 5,155,774 | 10/1992 | Numagami | 382/1 |
| 5,166,789 | * 11/1992 | Myrick . | |
| 5,379,045 | 1/1995 | Gilbert et al. | 342/357 |
| 5,432,520 | 7/1995 | Schneider et al. | 342/357 |
| 5,512,903 | 4/1996 | Schmidtke | 312/357 |
| 5,554,994 | 9/1996 | Schneider | 342/357 |
| 5,557,397 | 9/1996 | Hyde et al. | 356/5.01 |
| 5,570,095 | 10/1996 | Drouilhet, Jr. et al. | 342/357 |
| 5,596,494 | 1/1997 | Kuo | 364/420 |
| 5,617,317 | 4/1997 | Ignagni | 364/449.9 |
| 5,644,318 | 7/1997 | Janky et al. | 342/357 |
| 5,672,872 | * 9/1997 | Wu et al. | 250/330 |
| 5,848,377 | 12/1998 | Wong | 701/226 |
| 5,878,356 | 3/1999 | Garrot, Jr. et al. | 701/1 |
| 5,894,323 | * 4/1999 | Kain et al. | 348/116 |
| 5,977,908 | 11/1999 | Nichols | 342/357.08 |
| 5,999,211 | * 12/1999 | Hedges et al. | 348/144 |
| 6,084,510 | 7/2000 | Lemelson et al. | 340/539 |
| 6,091,359 | 7/2000 | Geier | 342/357.14 |
| 6,157,891 | 12/2000 | Lin | 701/301 |
| 6,166,686 | 12/2000 | Lazar | 342/357.14 |
| 6,178,363 | 1/2001 | McIntyre et al. | 701/16 |
| 6,179,246 | * 1/2001 | Fisel et al. | 244/3.16 |

* cited by examiner

Primary Examiner—Stephen C. Buczinski
(74) Attorney, Agent, or Firm—Christie, Parker & Hale, LLP

(57) ABSTRACT

A system for airborne detection of fires and transmission of fire location and characteristic data to the system ground station. The system includes an airborne pod and an associated ground station. The pod uses a passive infrared (IR) scanning system which employs a rotating and nutating mirror within an air slipstream driven propeller/spinner and is optically coupled to an infrared detector. A computer in the pod receives fire pod GPS position, IR detector fire spot detection pulse or 'hit' plus fire spot characteristics, spinner/mirror rotation and nutation angle at the 'hit' time and pod platform attitude relative to North-East-down using an on board Inertial Measurement Unit (IMU). The computer then calculates the firespot GPS location, and processes associated firespot characteristic data and downlinks this data to the ground station. Onboard pod video scene cameras also provide operational video that is also downlinked to the ground station.

28 Claims, 18 Drawing Sheets

SYSTEM DATA PROCESSING AND FLOW-RDF
POD TO GROUND STATION

FIG.5 SYSTEM DATA PROCESSING AND FLOW—IMU POD TO GROUND STATION

FIG.7 PRELIMINARY ROTATING SEEKER DESIGN DETAILS SHOWN UPSIDE DOWN FOR BENCH TESTS

SYSTEM BLOCK DIAGRAM

GPS LOCATIONS OF FIRE HOT SPOT AND MOVING VEHICLE CALCULATED BY IR-DETECTING DRONE AIRCRAFT

FIG. 12
SENSOR NUTATION/ROTATION ANGLE ENCODER
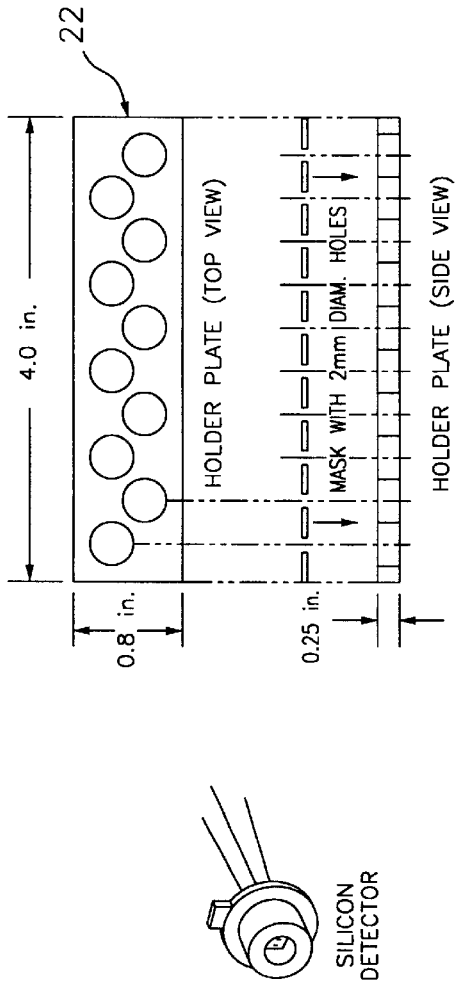
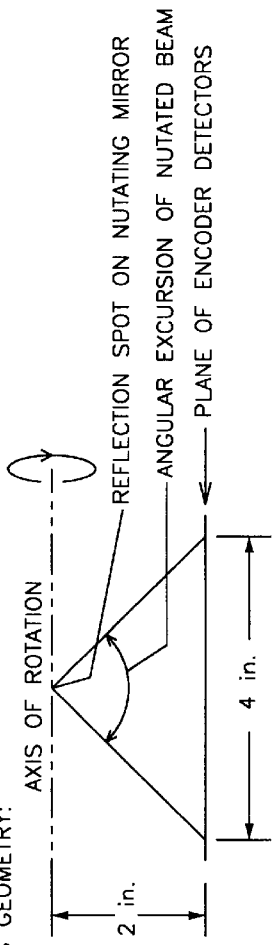
NOTES:
SILICON DETECTOR: EDMUNDSCIENTIFIC STOCK No. H53372 ($14.75 EACH)
0.210 IN. DIAM. MOUNT=TO -18:3.2 MM SQUARE SENSOR AREA: BOROSILICATE WINDOW.
DETECTORS PRESSED INTO HOLDER STAGGER-DRILLED FOR DETECTOR CANS.
MASK MADE OF 0.010 SHIM BRASS, FLAT BLACK PAINTED. MASK IS FLUSH AGAINST DETECTOR WINDOWS.
ENCODER MOUNTING GEOMETRY:

RELATIONSHIP OF AIRBORNE PLATFORM TO GROUND STATION IN THE LOCAL EARTH NORTH-EAST DOWN (N-E-D) SYSTEM

NORTH-EAST-DOWN (N-E-D) COORDINATE SYSTEM WITH
UNIT DIRECTION VECTORS TO THE GROUND STATION AND
UNIT DIRECTION TO NORTH IN AIRCRAFT X-Y PLANE

VECTOR DIAGRAM SHOWING SOLUTION OF THE "VIRTUAL" GPS SOLUTION AT THE FIRE HOT SPOT

AIRBORNE IR FIRE SURVEILLANCE SYSTEM PROVIDING FIRESPOT GEOPOSITIONING

CROSS-REFERENCE TO RELATED APPLICATION(S)

This patent application claims the benefit of provisional patent application no. 60/077,821, entitled FIRE SURVEILLANCE MODULE FOR DRONE OR MANNED AIRCRAFT USAGE, filed Mar. 12, 1998.

BACKGROUND OF THE INVENTION

1. Field of the Invention

This invention involves automatic detection of IR sources generated by forest fires. The precise global positioning system ("GPS") location of each source is automatically determined. Major components of this invention include an airborne instrumentation pod, and several GPS receivers, one in the pod, and one at a ground station at a known location. The primary function of this invention is un-manned detection of IR sources and computation of their latitude and longitude.

2. Description of Prior Art

Many drone-mounted, aircraft-mounted and hand-held fire IR imaging sensors have been and are being used in fire observation, research, measurement and detection. These approaches all lack the capability to automatically produce precise latitude/longitude/elevation fire location data. These images are directly observed by the pilot or observer, or telemetered to a ground control station for observation, relay to other fire stations, and storage. Locations of specific fire hot spots are approximated by a human observer who annotates the image data.

There are no known systems that provide un-manned and continuous real-time down-linking of fire IR hot spot locations to give immediate early fire location data to fire response groups. However, earth monitoring satellites with visible and IR cameras do observe and down link real time images of large area fires to satellite ground stations, who then forward these images to agencies at the fire site. This can only be done when the satellite is overhead, and only after the fire has spread over a large area to make it detectable from satellite altitudes.

Presently, fire fighting groups depend almost exclusively on human observation to locate fires. In Southern California, airline pilots provide most of the early fire detection. However, locations are only approximate, and the fires are often at a somewhat advanced stage. Fire containment at this stage is expensive and hazardous, compared with early interdiction at the small brush fire stage.

SUMMARY OF THE INVENTION

The present invention addresses the foregoing and other shortcomings of the prior art by providing a reliable low-cost system that will provide unique services throughout the full life cycle of a forest or brush fire.

The hardware of the invention described herein can take several forms: as a pod carried externally on a manned aircraft; the same pod mounted on a remotely piloted vehicle (RPV, or drone aircraft); or as an integral part of an RPV that is designed around it. As a separate pod, it can be fitted to a manned aircraft or to an RPV with little effort.

The primary and unique feature of this invention is the continuous use of three types of information onboard the airborne pod to precisely locate a fire in its early stages. The three types of information are in two forms.

In what is called the GPS/RDF (Radio Direction Finding) form, the following information is used: the pod's own GPS location; the direction in the pod's fuselage coordinate system to a ground radio or IR beacon at a known GPS location; and the true north (corrected magnetic) heading.

In what is called the GPS/IMU (Inertial Measurement Unit) form, the following information is used: again, the pod's own GPS location: the attitude of the pod in the earth's local coordinate system (here taken as local NED-North-East-Down.); and the altitude above the local terrain (AGL - altitude above Ground Level). The AGL altitude can be determined with a radar altimeter or with either a corrected precision barometric altimeter or a GPS receiver giving vertical position plus a pre-set reference ground altitude. This latter method will be needed, especially in hilly terrain.

In the GPS/RDF form the pod computes its position vector relative to the located ground beacon. It computes its attitude (yaw, pitch, and roll) in the local NED system and then computes the direction from itself to the detected IR hot spot in the local NED system. From this information, the pod solves the trigonometry to calculate the "Virtual" GPS location of the IR hot spot on the horizontal plane of the ground beacon. This information is continuously broadcast to any ground station by RF down-link.

In the GPS/IMU form the pod's GPS position and attitude (yaw, pitch, and roll) in the local NED system are determined by a GPS/IMU unit. The direction from the pod to the detected IR hot spot in the local NED system is then computed. Using its AGL altitude, the pod solves the trigonometry to calculate the "Virtual" GPS location of the IR hot spot on the horizontal plane. This information is continuously broadcast to any ground station by RF down-link.

The IR sensor to be used will be a commercially available CCD (charge-coupled detector) unit with several optional CCD's (charge coupled detector), filters, and electronic analog processing of its signal. The resultant data it produces will characterize each detected IR hot spot (intensity and spectral properties). This data for each IR hot spot will, in association with its computed "Virtual" GPS location, be RF down-linked to the ground station. At the ground station, the characterization data will, if it exceeds a pre-set threshold, activate computer display of a symbol on a forest map (using the "Virtual" GPS for graphic positioning) and trigger an alarm for human evaluation.

Additional features that can be added to the pod include a radio relay (voice and data) and ground-commanded video (visible and IR) imaging cameras' The cameras will provide surveillance for arsonist apprehension, or close-up examination of ground details in a spreading fire front. All of these features will lead to major cost savings through early fire containment and prevention of delayed hot-spot flare up.

BRIEF DESCRIPTION OF THE DRAWINGS

FIG. 12 is a diagram of an exemplary optics head mirror nutation/rotation angle encoder.

DETAILED DESCRIPTION OF THE INVENTION

Figure 1:
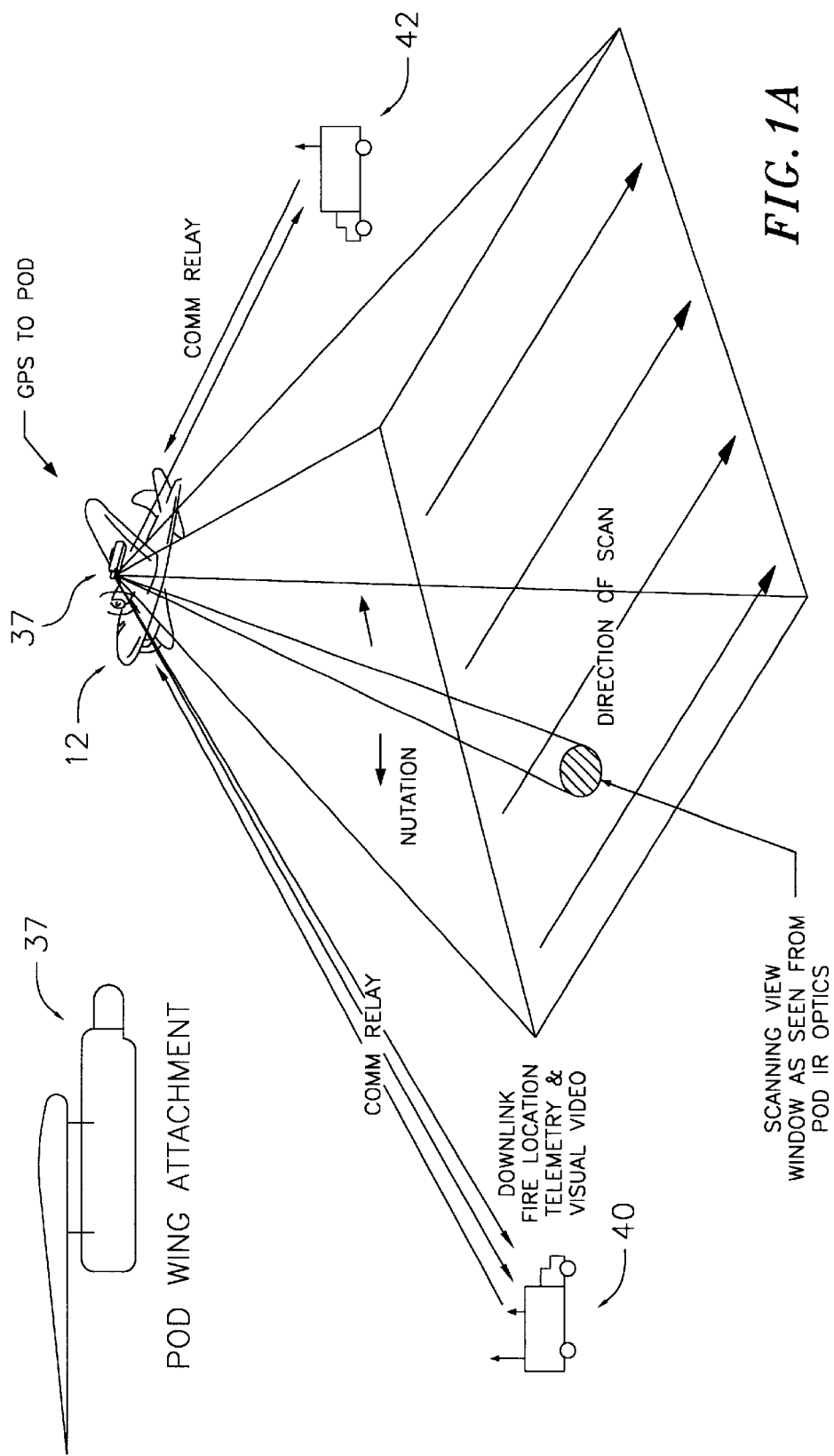
FIG. 1A is a view of the system containing airborne pod, ground station, data, command and communication links and other major components of the above system elements.
FIG. 1B is an exemplary view of the airborne pod attached to an aircraft wing.

The airborne part of the system for locating IR forest fire hot spots is called the airborne platform. FIG. 1A shows the Airborne Platform in a pod form 37 that can be carried on a manned aircraft 12 or on an RPV (remotely piloted vehicle), or drone without any change in configuration. FIG. 1B is a side view showing the pod 37 carried on an aircraft wing 120 with pylons 122. Regardless of how the pod is carried, no human involvement is required during the initial scanning for IR sources and generation of their latitude and longitude locations. The RPV version can also be guided by a flight programmer once a remote pilot has flown it to a designated patrol location over the forest area to be monitored. The flight programmer initiates a search pattern, using GPS navigation to provide surveillance of the desired area.

A ground station 40 and a fire unit 42 are provided. The pod 37 has a rotating and nutating IR scanner which detects and characterizes hotspots, calculates hotspot locations, downlinks spot locations and characteristics, and relays voice commands to ground fire units 42 via communication links. The ground station receives downlinks from the pod 37, filters the data, displays hot spot hits, and can relay data to operation centers.

Figure 2:
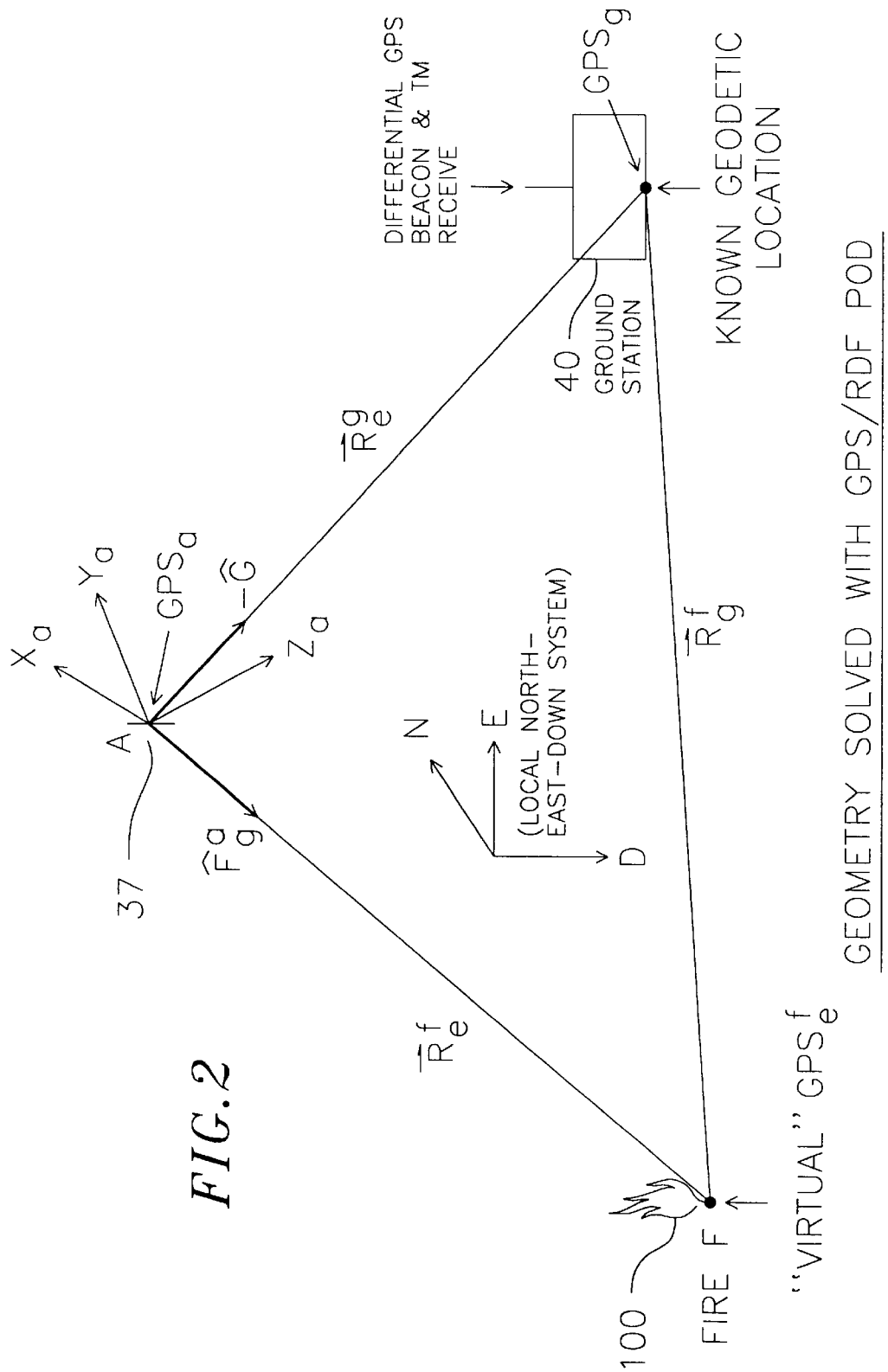
FIG. 2 shows the geometry involved in solving for the "Virtual" GPS of a detected IR hot spot using the GPS/RDF form of the airborne pod.

Turning to FIG. 2, there is shown the geometry solved with GPS/RDF. The airborne platform with pod 37 sights a fire 100. The ground station 40 communicates with the pod 37. The ground station 40 will have a known geodetic location and will be equipped with GPS, and preferably a differential GPS beacon and transmitters and receivers. The pod 37 will have its own GPS location, will acquire the direction of the pod's fuselage coordinate system to a ground radio or IR beacon at a known GPS location (e.g. the GPS location of the ground station 40), and a true north (corrected magnetic) heading. The pod 37 computes its position vector relevant to the located ground beacon, and computes its attitude (yaw, pitch and roll) in the local NED system and in turn computes the direction from itself to the detected IR hot spot in the local NED system. From this information, the pod solves the trigonometry to calculate the "virtual" GPS location of the IR hot spot on the horizontal plan of the ground beacon $GPS_e^F$. This information is continuously broadcast to any ground station by RF downlink.

Figure 3:
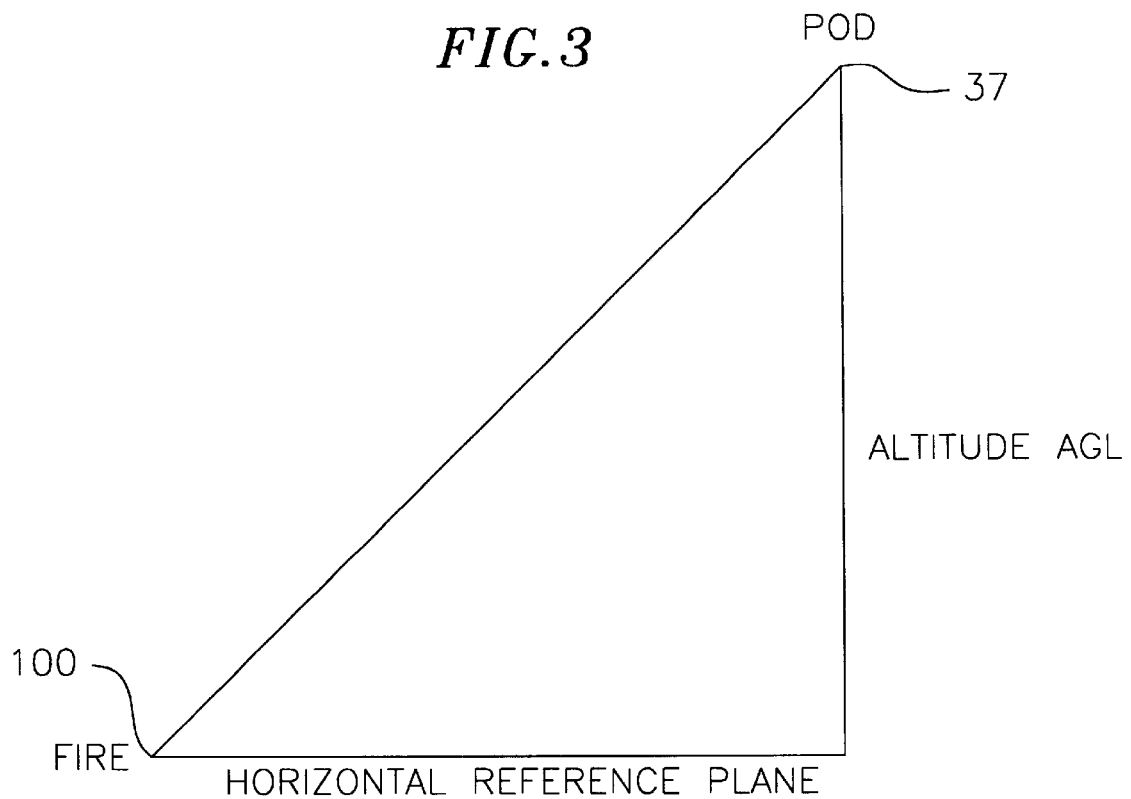
FIG. 3 shows the geometry. involved in solving for the "Virtual" GPS of a detected IR hot spot using the GPS/IMU form of the airborne pod.

FIG. 3 is a view showing the geometry of fire detection solved with the GPS/IMU pod approach. The pods own GPS location is used, along with the attitude of the pod in the earth's coordinate system (e.g. NED-North-East-Down), the altitude above the local terrain (AGL-altitude above ground level). The AGL altitude can be determined with a radio altimeter, with a corrected precision barometric altimeter or a GPS receiver giving vertical position plus a pre-set reference ground altitude. Using the AGL altitude, the pod 37 solves the trigonometry to calculate the "virtual" GPS location of the hotspot on the horizontal plane. This information can be relayed to any ground station 40, (e.g. by RF downlink).

Figure 4:
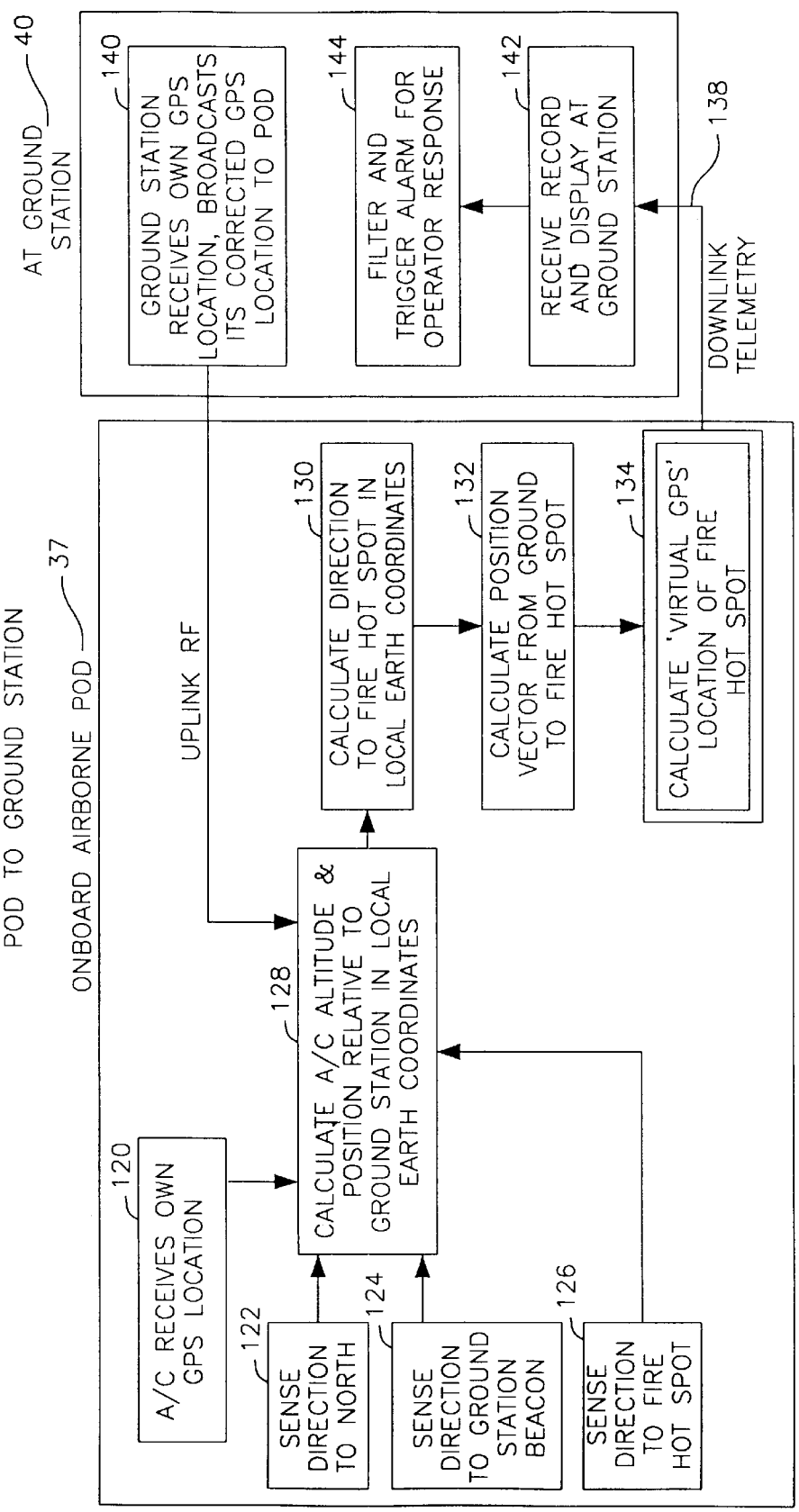
FIG. 4 shows the data flow in the system using the GPS/RDF form of the airborne pod.

Turning to FIG. 4, there is shown a system data processing and flow for the GPS/RDF approach. The pod 37 received its own GPS location 120, senses its direction to north 122, senses its direction relative to the ground station beacon 124 (or alternately to a geosynchronous satellite), and senses the direction to the fire hot spot 126. The pod calculates its altitude (yaw, pitch and roll) and position relative to the ground station in local earth coordinates (e.g. NED) 128. The pod calculates the direction to the fire hot spot in local earth coordinates 130, calculates the position vector from the fire hot spot 132, and finally calculates the virtual GPS fire hot spot location 134. The ground station receives its own GPS location, and broadcasts its corrected GPS location to the pod 140. The downlink telemetry from the pod is received, recorded and displayed at the ground station 149, and is filtered to trigger an alarm for operator response if required 144.

Figure 5:
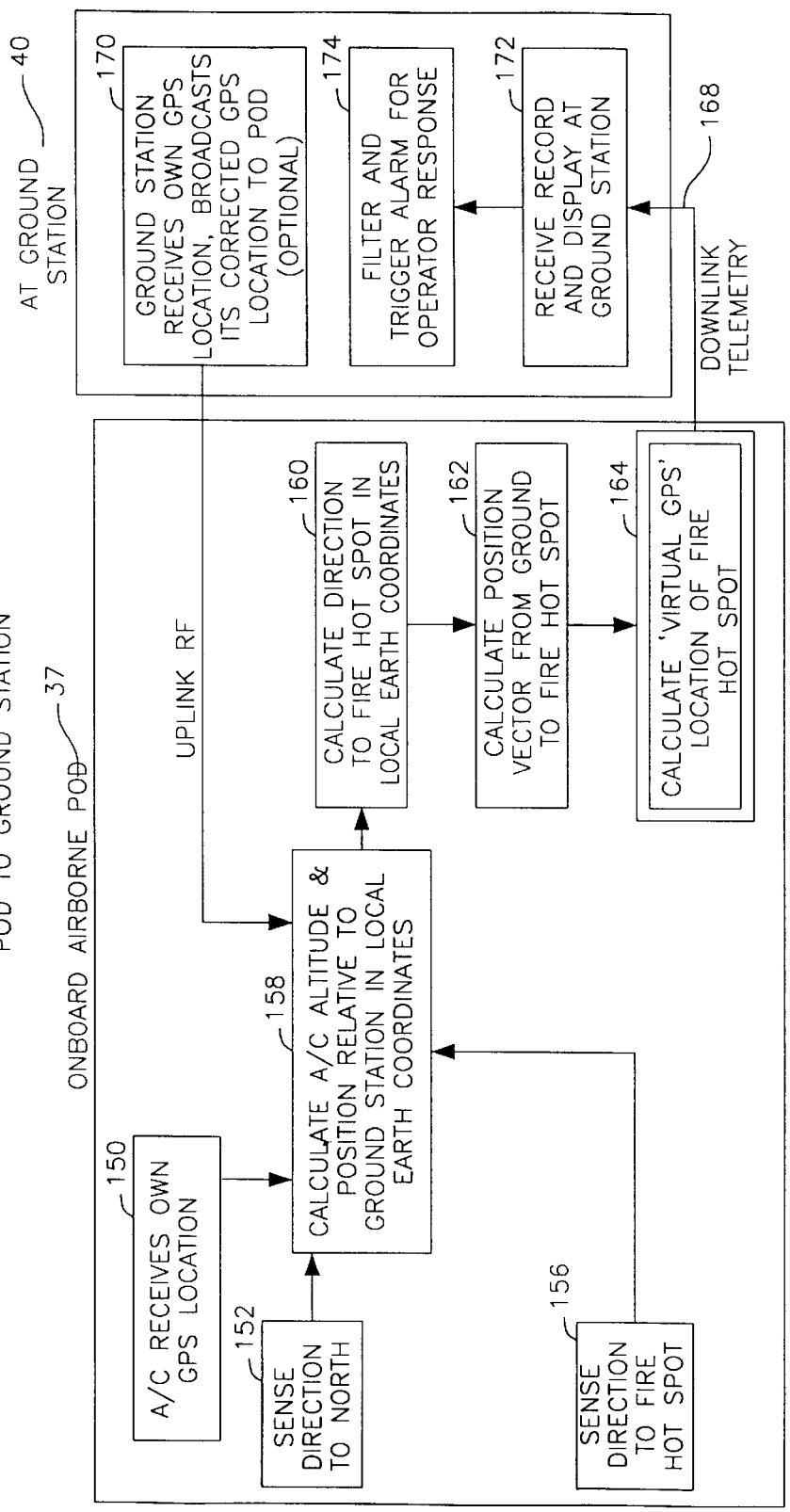
FIG. 5 shows the data flow in the system using the GPS/IMU form of the airborne pod.

Turning to FIG. 5, there is shown a system data processing and flow for the GPS/IMU approach. The pod 37 receives its own GPS location 150, senses its direction to north 152, and senses the direction to the fire hot spot 156. The pod calculates its altitude (yaw, pitch and roll) and position relative to the ground station in local earth coordinates (e.g. NED) 158. The pod calculates the direction to the fire hot spot in local earth coordinates 160, calculates the position vector from the fire hot spot 162, and finally calculates the virtual GPS fire hot spot location 164. The ground station 40 has uplinks 166 (e.g. RF) and the pod has downlink telemetry 168. The ground station receives its own GPS location, and optionally broadcasts its corrected GPS location to the pod 170. The downlink telemetry from the pod is received, recorded and displayed at the ground station 172, and is filtered to trigger an alarm for operator response if required 176.

Figure 6:
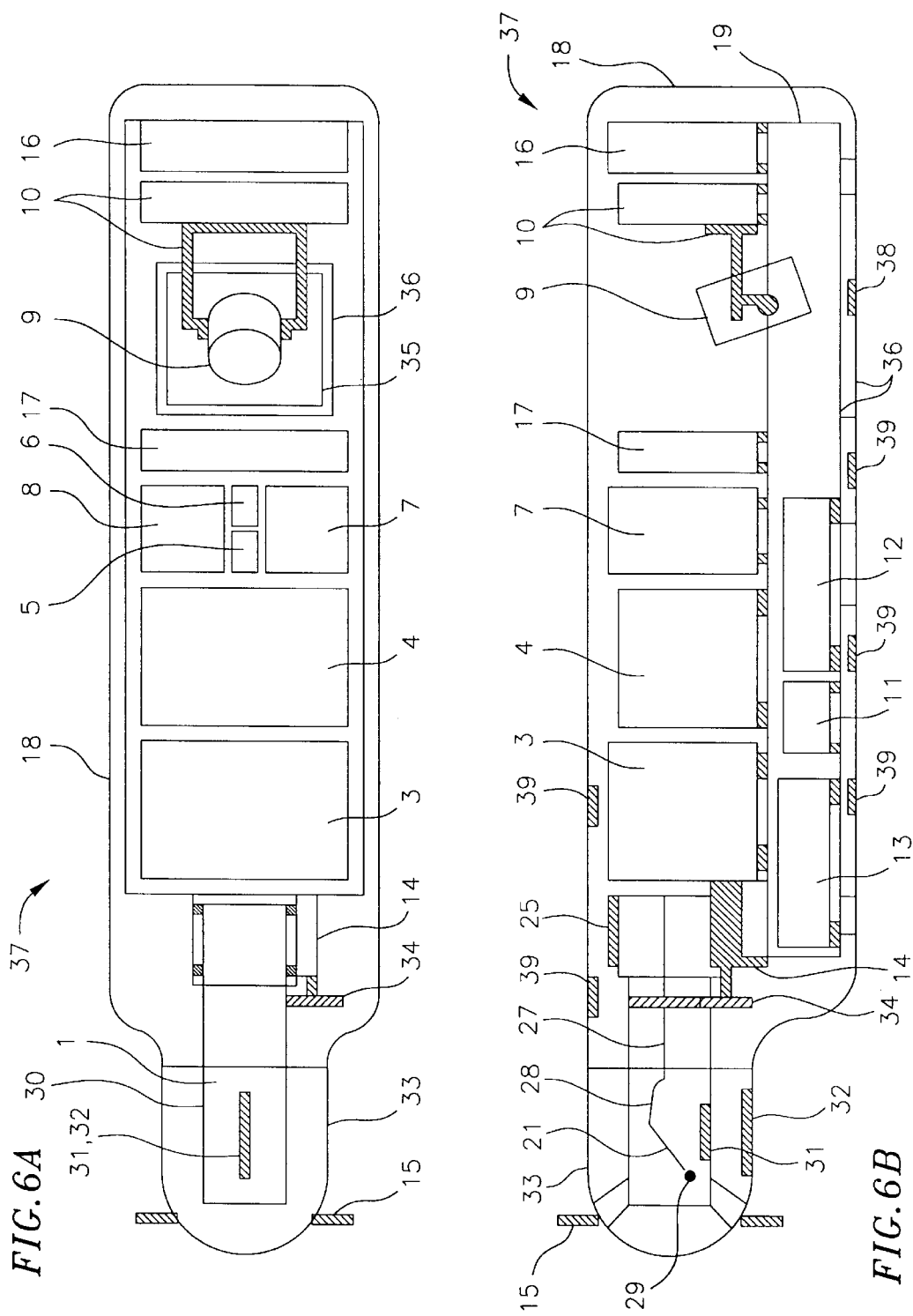
FIG. 6A is a detailed top view showing an advanced version of a pod.
FIG. 6B is a detailed side view of the pod of FIG. 6A.

The input and sensing portion of the IR detector optical system is contained in a spinner 33 called the optics head at the nose of the pod 37 rotated by a spinner prop 15 driven by the air slipstream as shown in FIGS. 6A and 6B. This spinner prop could also provide power for the electronics of the pod. Precisely constant spinner/optics head RPM is not essential to this invention; the rotating mass of the optics head and spinner combination will insure RPM will stay at a steady state enough to prevent rapid fluctuations in RPM which could induce vibration. This will also insure adequately constant RPM during a scanning nutation cycle of the rotating mirror inside the optics head. The RPM, set at a level between 2000 and 2500, insures adequate dwell time of the scanner mirror field of view to allow a small (one to several square feet) area fire to irradiate the detector with enough photons to yield a usable signal to noise ratio to provide the computer with a 'hit' pulse and fire spectral/ intensity information. The spinner/prop could also drive a generator which in turn drives a constant speed motor driving the optics head at a very constant RPM. At any rate, the spinner will drive an internal generator which will in turn power the avionics.

Figure 15:
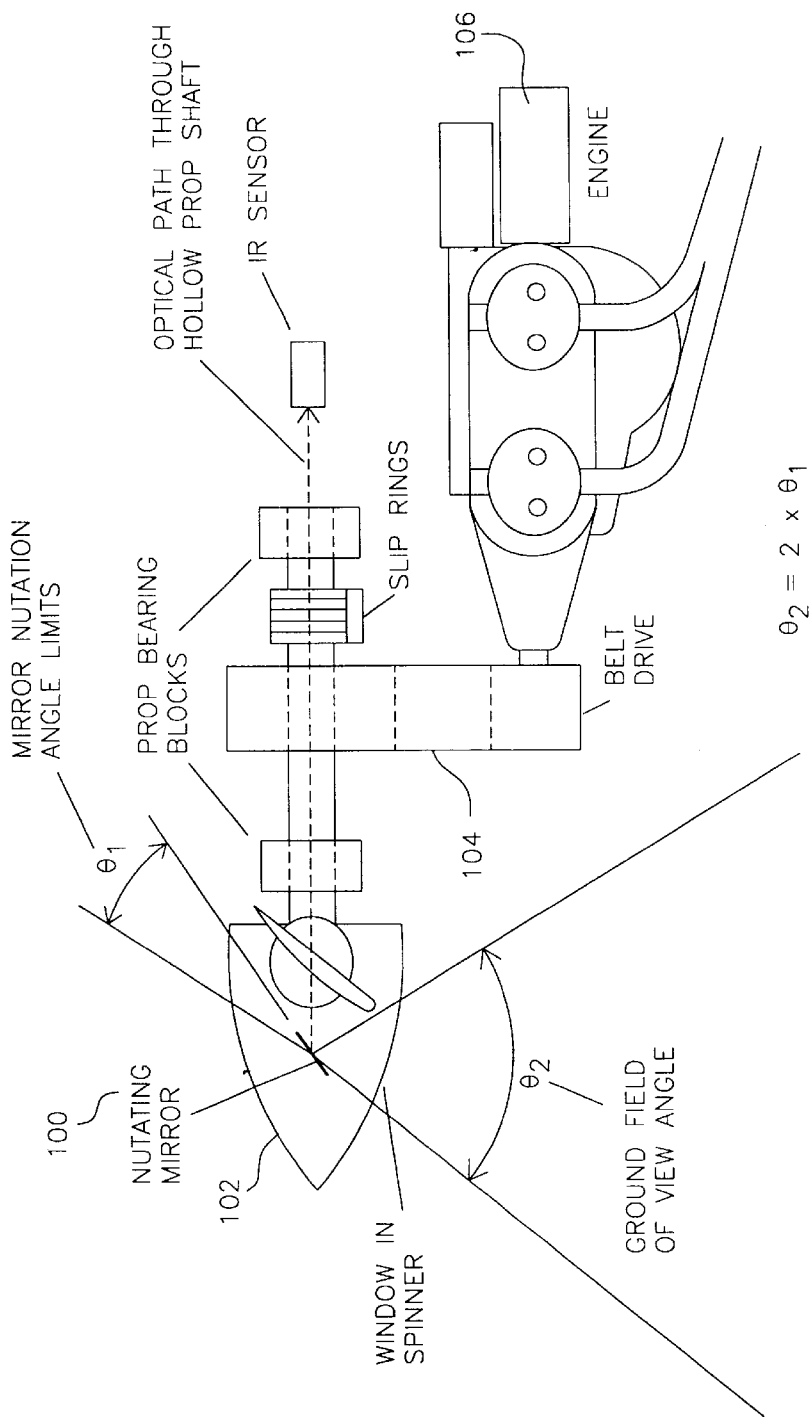
FIG. 15 shows an engine driven optics head using belt drive to isolate engine vibration.

Another variation shown in FIG. 15 puts the nutating mirror 100 of the optics head inside the RPV propeller spinner 102. The RPV propeller spinner is driven via belt drive 104 by the RPV engine 106. This isolates engine vibration away from the optics head. The engine can also drive a generator which provides power to the avionics (not shown).

There are a number of possible embodiments of this invention, each having several variations. Associated figures are labeled accordingly so as to keep the preferred embodiment clearly described. Referring to the preferred embodiment shown in FIGS. 6A and 6B, the pod 37 is equipped with the following subsystems: a rotating spinner optics head 1 containing optics for initial fire IR spot scanning. The rotating optics include a nutating mirror 21 which exposes an IR detector 3 to JR radiation from the scanned forest floor area in a systematic tracing pattern. The IR detector detects the IR 'hit' from the fire spot scanned image and converts this IR energy to a hit pulse, fire characteristics data and transmits this as RS232 or equivalent data format to the computer 4. The computer 4 derives by triangulation the geoposition of the fire spot. A GPS receiver 5 provides pod GPS latitude and longitude (straight or differential) to file computer 4. An Inertial Measurement Unit 6 provides pod platform attitude against North East down coordinate frame. It also senses true North by sensing Earth rotation direction. A telemetry transmitter 7 for downlinking firespot location and characteristics digital information, a video transmitter 8 for downlinking scene camera set video 9 (IR and visual) provide the total downlink to the ground station. A scene camera control unit 10 drives the camera set lateral and fore/aft look angles and zoom control for scene examination. The scene or video camera set 9 views the terrain through a cutout 35 in the pallet 19 floor and a windowed viewport 36 in the airframe 18 belly. The command receiver 11, receives uplink commands from the ground station for camera set 9 control, other key commands for pod avionics control. The communications relay transceiver 12 relays voice communications from the ground station to the operational ground fire fighting (or arson apprehension units). The power conditioner 13 is a power supply which regulates and delivers DC power to the avionic, and generator 14 (which is geared or belt driven off the rotating optics head barrel 34 feeds the power conditioner 13 and contains battery charging interface. The slipstream propeller 15 mounted on the spinner 33 provides drive for the rotating optics head 1 and, in turn, the generator 14. A cooling unit 16 provides filtered cooling air for the avionics. This is augmented by ram air filtered air cooling once airborne. A battery 17 provides power for the avionics on the ground before slipstream air takes over on providing generator 14 power. The pod airframe 18 houses the above listed avionics which are mounted on a double deck pallet 19 equipped with vertical partitions for EMI proofing and structural strength. The rotating optics head 1 is of sufficient mass to minimize variation and vibration of the line of sight. The angular momentum of the rotating shaft provides a stable platform for a more repeatable line of sight in the mirror based scanning system. This is also important on a small platform in rough air.

Figure 7:
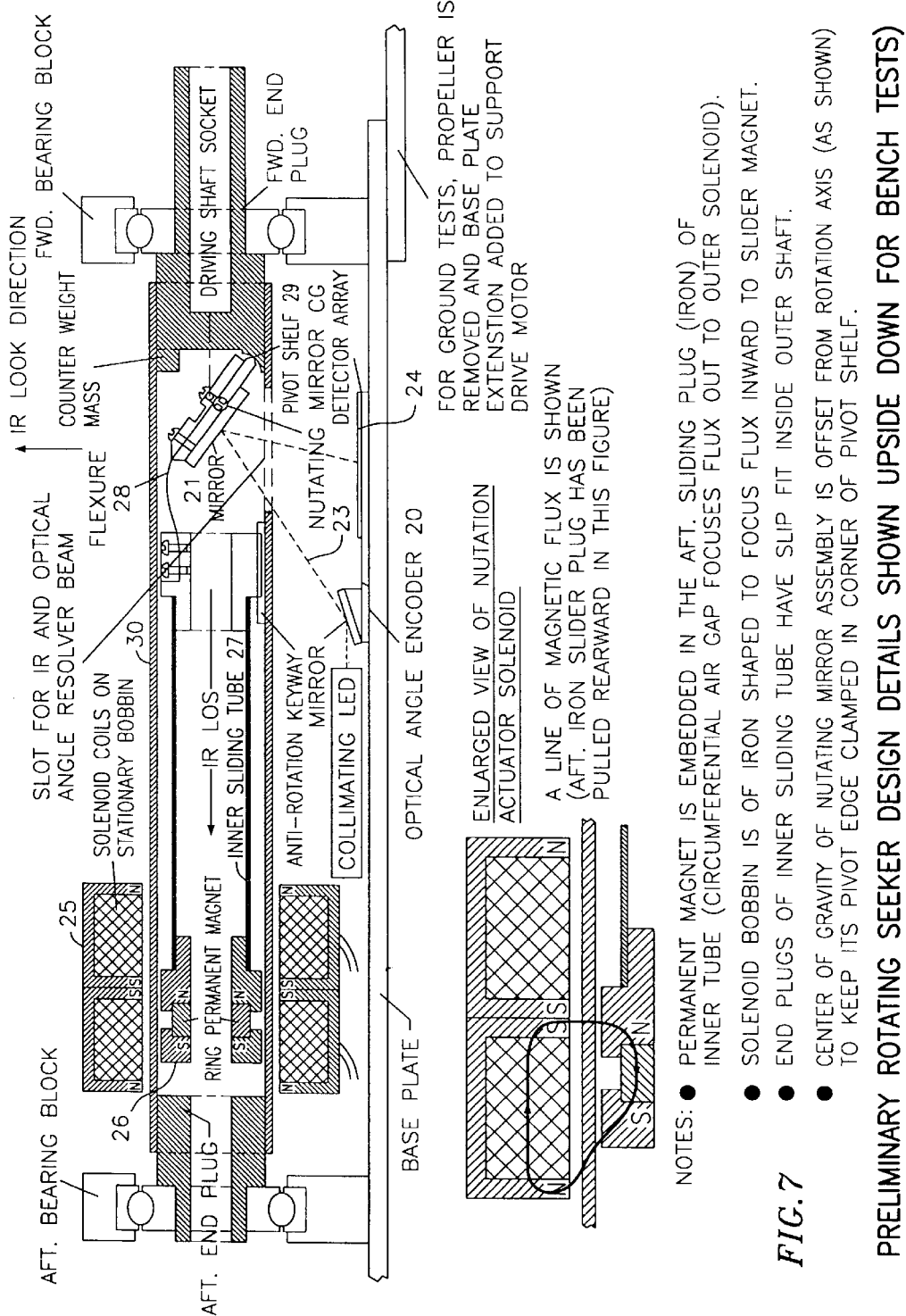
FIG. 7 is a detailed side view of the airborne pod of FIG. 6.

It is necessary to know the fore-and-aft and side-to-side direction to a detected fire IR hot spot. These two directions in the airborne pod platform's coordinate system are then used in the computer 4 processor along with other information to compute the position of the IR spot. Turning to FIG. 7, a fixed optical angle encoder 20 outside the optics head barrel 30 (LED reader/encoder) can read rotation angle position of the scanner through a viewport. This can also be accomplished by computer integration of the IR hit time presented by scanning mirror 21 nutation angle reader 22 (see FIG. 12). This reader 22 measures the scanning mirror 21 nutation angle by using a LED laser 23 beam reflected off of the mirror 21 onto a linear array of photodetectors 24, including CCDs (Charge Coupled Device), each photodetector wired to an angle encoder 25 (shown in FIG. 6B) which sends nutation angle data to the computer 4. This is the top dead center time reference to which the IR hit time is compared in the computer for computation of rotation angle at the IR hit time. The computer adjusts the small mirror nutation change from top dead center to IR hit rotation angle change. The mirror 21 rotation and nutation angles are processed to determine the line of sight direction to the IR spot, rotation angle for lateral side to side line of sight angle component and nutation angle for fore and aft line of sight angle component. Nutation provides better probability of detection of a small IR spot by re-sweeping over the spot several times as the pod is flown straight and level over and past the spot. The mirror 21 can be split and each half angularly offset by several seconds of arc (not shown). This provides a double pulse to the IR detector while still maintaining precise line of sight integrity from the pod to the spot. The double pulse increases the detector effective signal to noise sensitivity. The mirror 21, mirror nutation is actuated by means of an actuation system made up of a solenoid actuator 41 outside the rotating barrel which moves a core 26 inside the rotating barrel and connected to a pushrod or inner sliding tube 27 aligned down the barrel interior toward the mirror 21 and connected to the mirror 21 through a flexible flexure 28. The mirror 21 is seated in a pivot shelf 29 inside the barrel 30 such that centrifugal force and mirror 21 center of mass keep the mirror seated. A clevis/pin attachment can also insure the mirror stays on the pivot 29. Solenoid action moves the pushrod 27 which in turn forces the flexure 28 to nutate the mirror 21 about the pivot 29 during barrel 30 rotation, accomplishing the full scanning process. As shown in FIGS. 6A and 6B, viewports 31 and 32 on the optics head barrel 30 and spinner 33 allow the IR source ray trace to enter the mirror 21 field of view for reflection down the barrel 30 to the IR detector 3.

Figure 8:
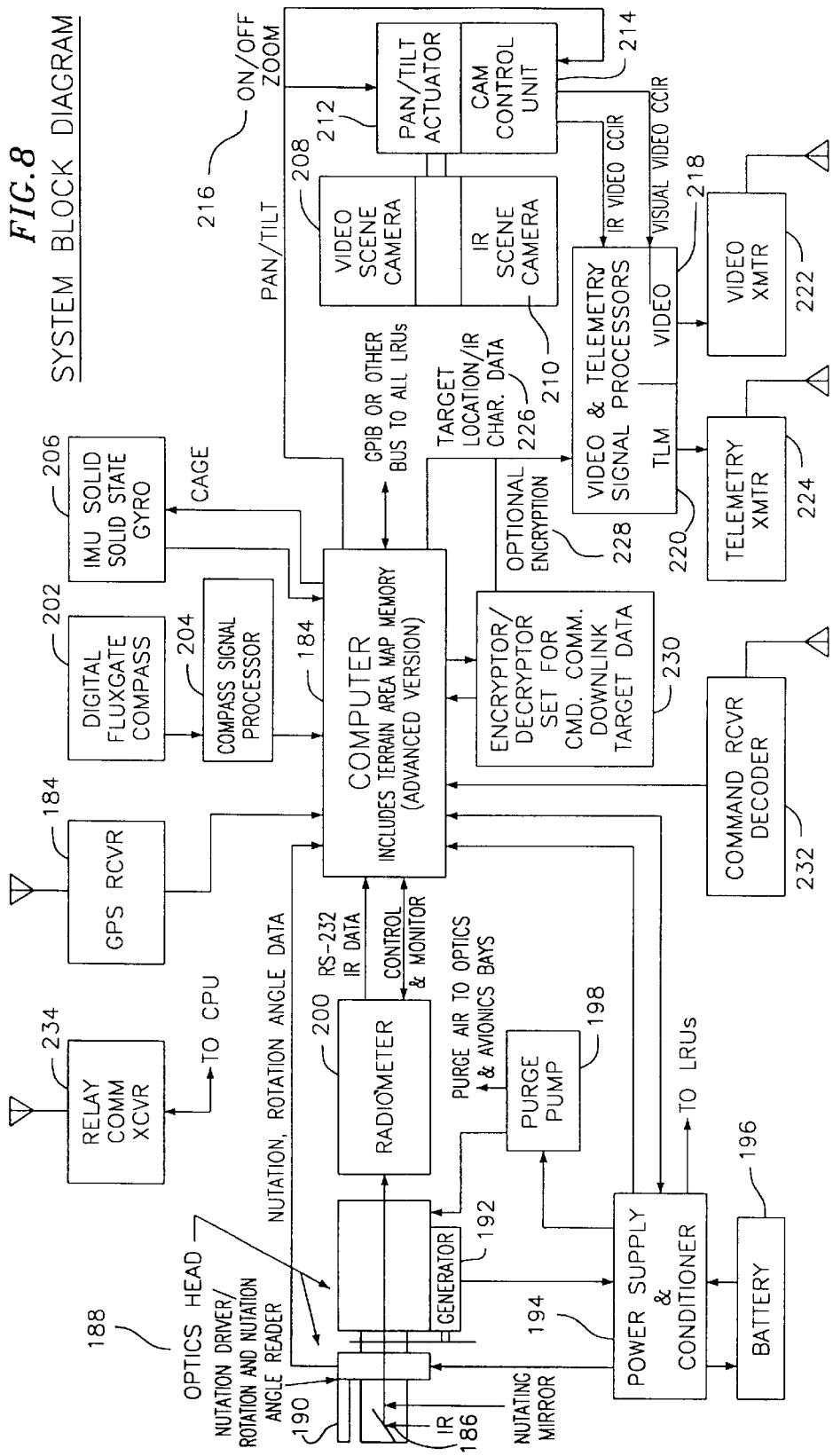
FIG. 8 is a functional system block diagram of the pod and ground station.

Referring to FIG. 8, there is shown a system block diagram 180 of the various functional elements and features of the pod. For the sake of convenience, reference numeral used in describing FIG. 8 may not match those used in describing like elements in FIGS. 6A, 6B and 7. A computer 182 is provided which, in addition to providing processing power, will optionally be able to store a terrain area map in memory. A GPS receiver 184 is connected to the computer 182, and is used to determine the pod's location. A rotating and nutating mirror 186 is in an optics head 188. Also provided is a nutation driver 190. A generator 192 is connected to a power supply and conditioner 194 and battery 196. A purge pump 198 supplies purge air to the optics and avionics bay. A radiometer 200 is supplied and communicates with the computer 182. The radiometer 200 has detectors which measure the IR signal from the mirror. (e.g. CCD arrays).

For the GPS/RDF embodiment, a digital fluxgate compass 202 communicates with a compass signal processor 204 data and feeds the compass direction to the computer 182. An IMU solid state gyro 206 communicates with the computer and provides the computer with data from which the pod's attitude can be accurately determined. A video scene camera 208 and IR scene camera 210 are connected to a pan/tilt actuator 212 and a camera control unit 214, and are controlled by the computer 182. In addition, zoom features can be controlled 216. The video scene camera and IR scene camera 210 are preferable harnessed together. Video and telemetry signal processors 218 and 220, respectively, are provided. The video signal is transmitted by a video transmitter 222 and the telemetry signal is transmitted by a telemetry transmitter 224. The video and telemetry signal processors 218 and 220 are in connection with (or optionally part of) the computer 182, and the IR hot spot location and characteristic data (e.g. intensity and temperature) 226 can be fed to the telemetry signal processors 220. This data can optionally be encrypted, and uplinked and downlinked data to and from the pod can be encrypted and decrypted 230. A command receiver decoder 232 can also be provided to uplink commands, and a relay communication transceiver 234 is also provided connected to the computer 182.

The IR detector 3 (FIGS. 6A and 6B) will contain several types of IR CCDs to detect the fire temperature 3–6 micron wavelength IR (usually InSb type) and longer wavelength 9–14 micron HgCdTe CCDs to pick up vehicles, people, etc. This small array of perhaps 50–100 CCDs will present a stronger hit pulse than a single CCD and also provides a multi-spectral capability which the operator can use.

All data is processed and computations made (using onboard software) to generate the downlink data having the computed fire hot spot IR location in latitude and longitude as well as its radiation signature parameters (wavelength/spectrum, intensity). The basic transformation equations for computing the IR location are discussed below in the subsection entitled "Mathematical Proof." The down-link IR location and optical characteristics data is fed from the computer 4 into the downlink telemetry transmitter, while the video camera set 9 feeds RS 170 format visual and IR video to the video downlink transmitter 8, for downlinking via antennas 38 and 39 to the Ground Base Station 40 (See FIG. 1A)(antenna 39 for all other functions), The ground Base Station 40 can either be mobile or fixed, or a combination of fixed and mobile stations operating with multiple aircraft covering different forest areas such as wide Southern California high desert forest areas prone to active fire seasons at the same time. Each aircraft flown pod 37 would be assigned its own telemetry channel for ground station usage.

Figure 9:
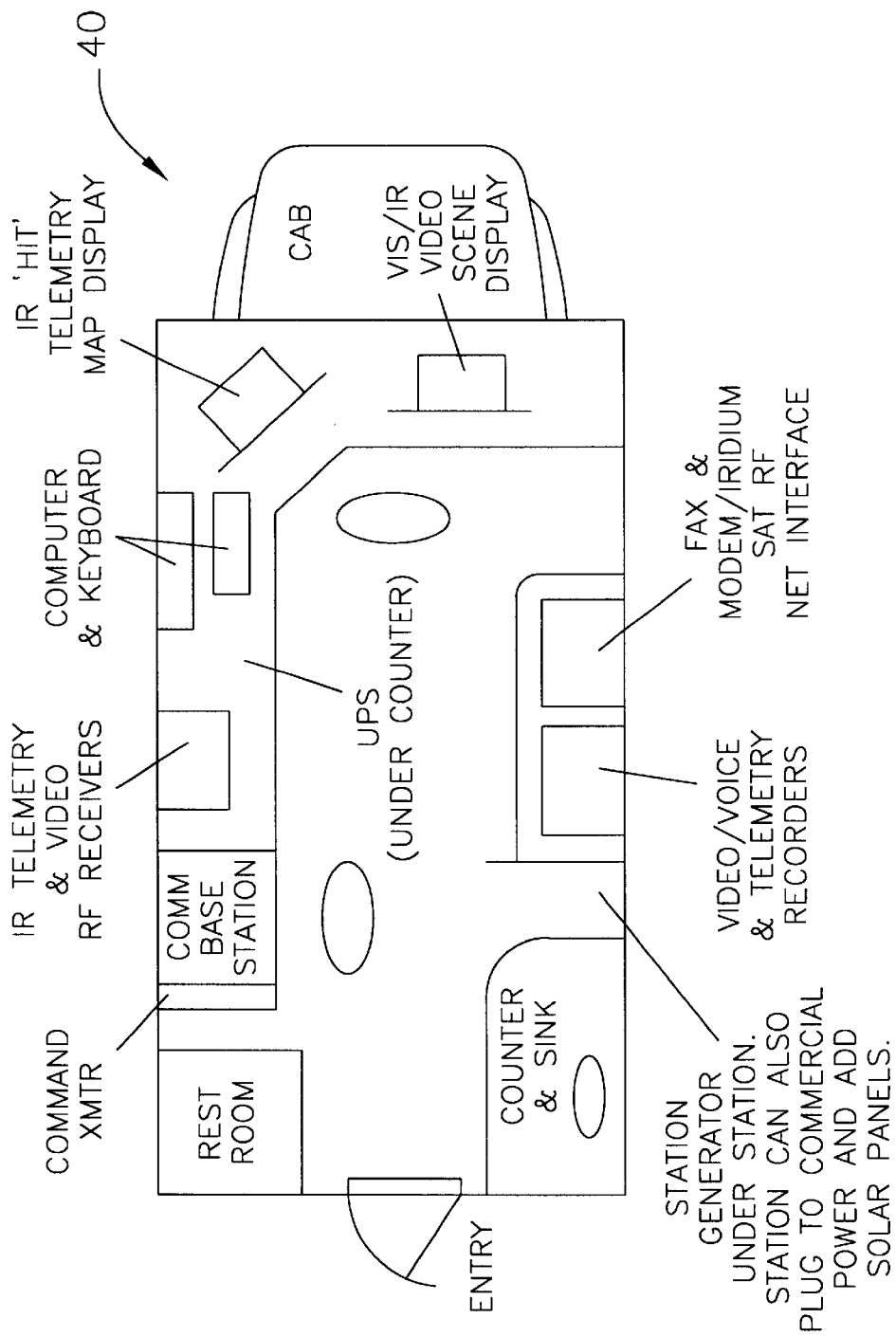
FIG. 9 is layout of the system elements of the mobile ground station.

Referring to FIG. 9, the Ground Base Station 40 would contain a suite of C3 (command, Control & Communications) equipment to effect fire location and control of early suppression/arson apprehension operation. Since the preferred method of pod 37 transport is by manned aircraft for flight safety and lower overall cost, no details will be expended on the RPV control and navigation, etc. The station 40 would also contain recording, fax, cellular or other data link interfaces to outside agencies. The display equipment would include a map display of the IR telemetry data plus a separate display of the IR and visual scene camera downlink. An optional GPS differential transmitter could be located on the ground station for increasing the accuracy of the pod's 37 GPS precision. Relay communications, uplink command, downlink telemetry and video will be via satellite relay in the advanced version of this system. The ground station would contain an alarm system based on a preset trigger level of irradiance for selected IR spectral bands so the operator can respond to only real fire threats. The fire target display would be in a map format showing fire spot location, intensity and temperature plus the forest map highlights for ground coordination. The video scene display could be split screen showing infrared video on one side and visual on the other side. The relay communications 'base station relay communications' transceiving equipment would include all appropriate fire and police frequencies plus others required for ground coordination, which could also be expanded to air coordination.

Figure 10:
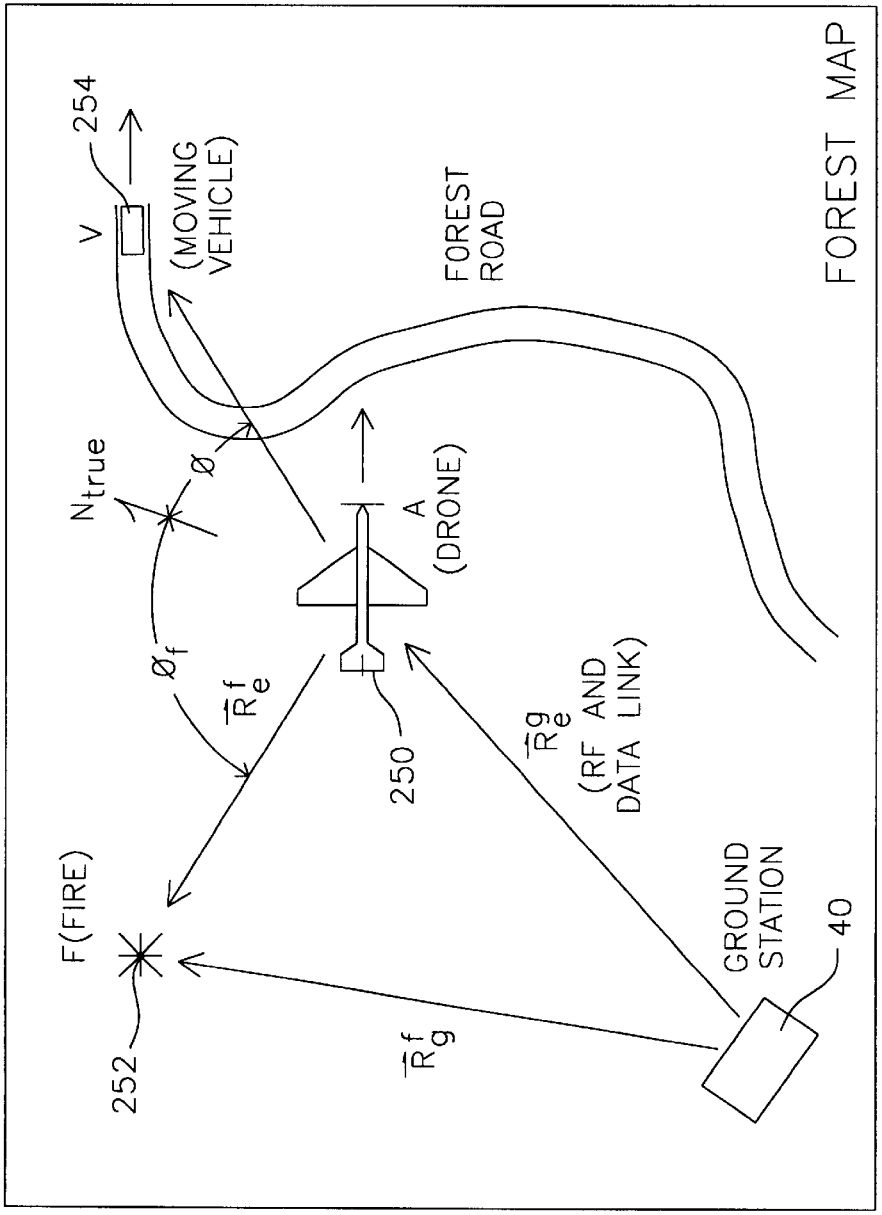
FIG. 10 is a plan view of the forest area with the ground station airborne carried pod, and associated azimuth angles between the pod axis and true North. fire and vehicle.

Referring to FIG. 10, a plan view of the forest area with ground station 40, airborne carried pod 37 (on a drone aircraft 250), the fire site 252, a moving vehicle (e.g. a fire vehicle) 254 are shown, with their associated azimuth angles between the pod axis and true north, the fire and the moving vehicle.

Figure 11:
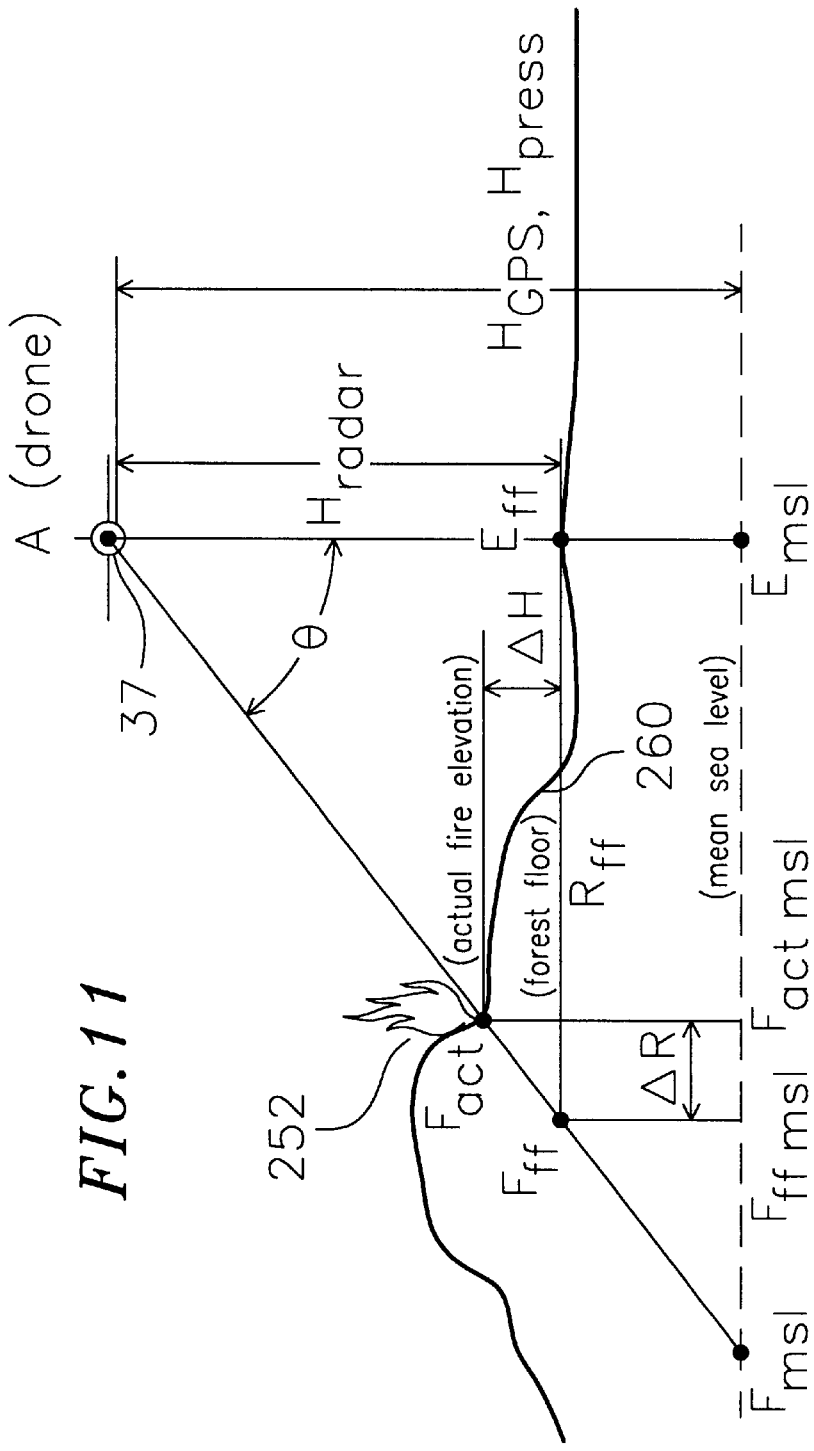
FIG. 11 is an elevation view showing the relationship of uneven ground and error in computed GPS location of an IR fire hot spot.

FIG. 11 is an elevation view showing the relationship of uneven ground (e.g. the forest floor) 260 and error in the computed GPS location of an IR fire hot spot, $F_f$. The fire position GPS error is equal to $\Delta R$, which is equal to $\Delta H \tan \Theta$, and this error arises out of difference between the altitude of the pod 37 above the forest floor $E_{ff}$ and elevation differences at the fire hot spot (e.g. in hilly terrain). By incorporating topographic map data (see FIG. 8 and its discussion thereof), it is possible to provide the corrected or minimized error in the detected fire hot spot.

Figure 13:
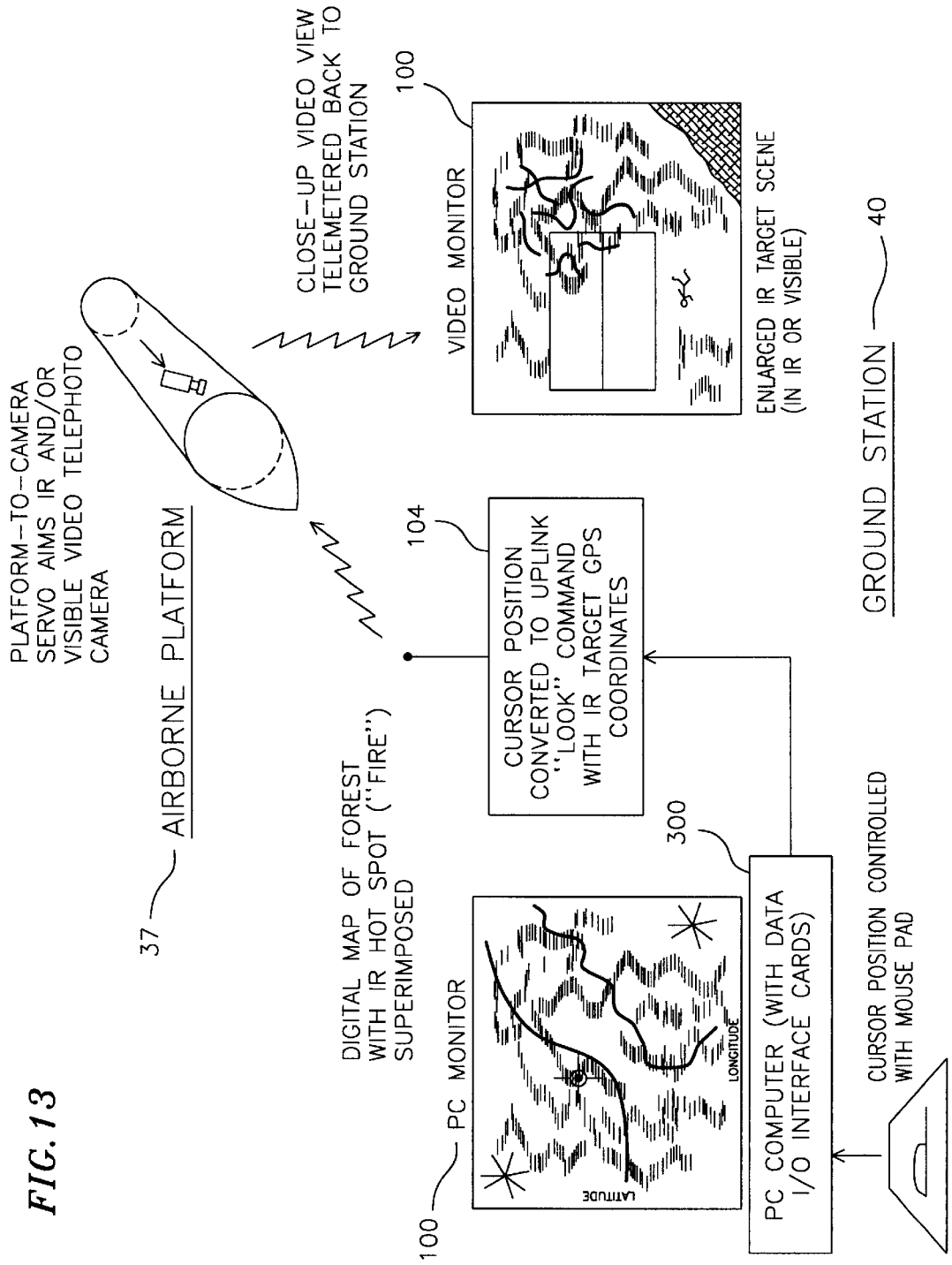
FIG. 13 shows the retargeting mode.
Figure 14:
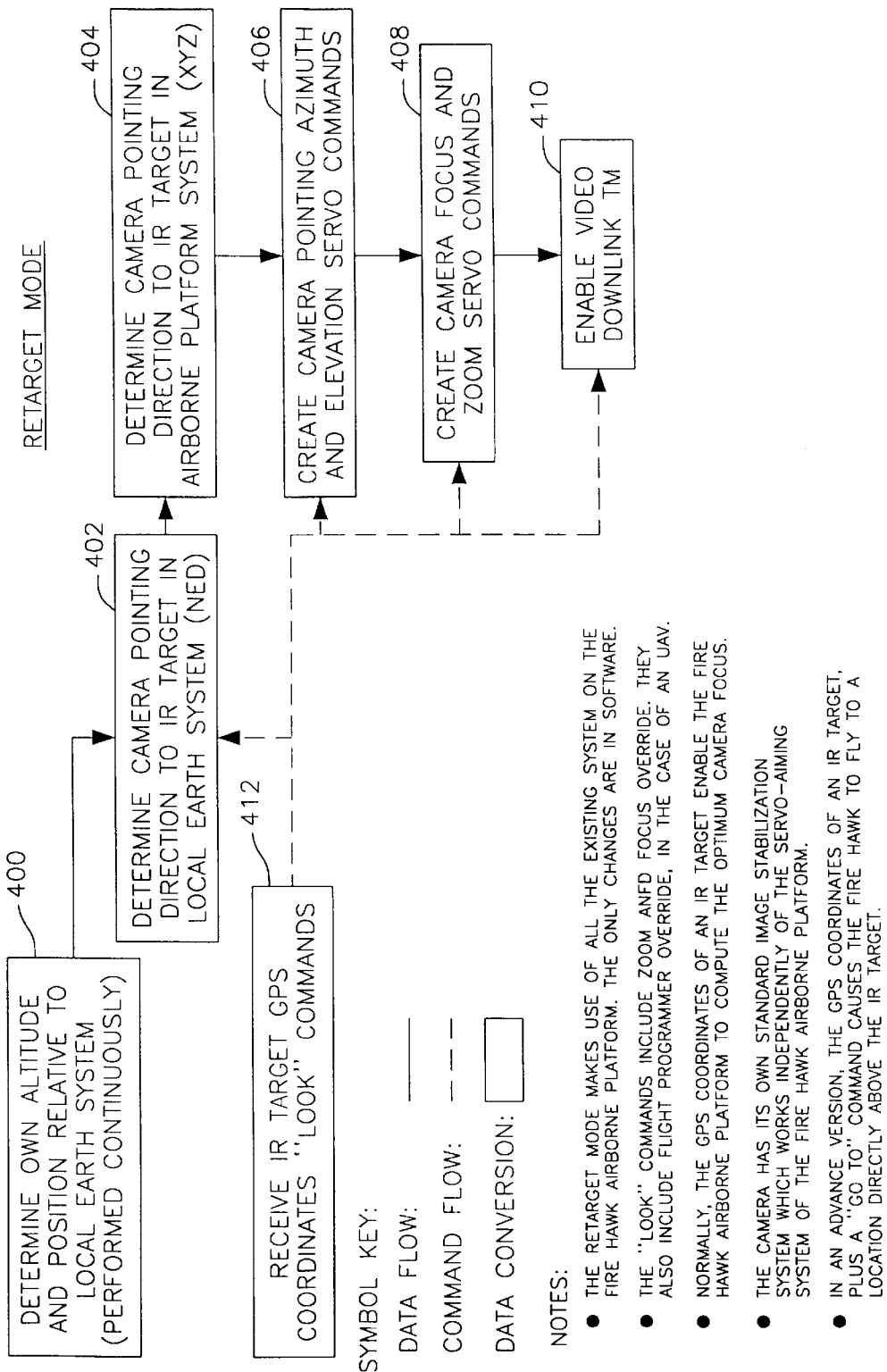
FIG. 14 is the retargeting mode flow diagram.

Turning to FIGS. 13 and 14, a retargeting mode of the invention is shown. In the retarget mode, a user at the ground station can control the IR or visible light camera in the pod to pan a fire scene and/or zoom to a desired scene. On the airborne platform 37, a camera servo aims the IR and/or visible video camera (which should be zoomable). At the ground station 40, a user will have a monitor 100 with which they see a visual map of the forest floor with the IR hot spot shown. Fire IR hot spot characteristic information can be displayed. The user can have a computer 300 and software which displays a cursor which appears on the PC monitor to allow the user to control the cameras on the pod to focus on particular areas of the map. This cursor position is converted to an uplink "look" command with IR target GPS coordinates 104. This uplinked command controls the cameras on the pod, and the newly acquired images are telemetered back to be ground station, where the user can see an enlarged IR and/or visible images on the monitor 100.

More detailed operations of this are shown in the flowchart of FIG. 14, wherein the pod determines its own attitude and position relative to the local earth system (performed continuously) 400. Next, determine the camera pointing direction to IR target in the local earth system (NED) 402. Next, determine camera pointing direction to the IR target in the airborne target system 404. Camera pointing azimuth and elevation servo commands are generated 406. Camera focus and zoom serve commands are created 408, and video downlink transmissions are enabled 410. IR target GPS is received and coordinated to "look" commands 412.

In summary, the primary elements of this system consist of the self contained pod 37 and the Ground Base Station 40 which provide early fire GPS based computed location and display plus relay communications coordination from the Ground Base Station 40 through the pod 37 to the ground fire units.

From the foregoing, the fire spot location invention described here uses a unique combination of infrared optics, GPS and coordinate transformation processing. The major part of the fire IR hot spot location computation is done on the airborne pod, although part of the data processing may also be done at a mobile or fixed ground base station. Additionally, airborne relay of communications and scene video (IR and visual) through the pod can enable the ground station to communicate with police units for arsonist apprehension and to fire units for early fire containment.

Mathematical Proof

The following is a mathematical proof of the ability of the pod platform to self-orient in yaw-pitch-roll attitude, using only its own GPS location, true north, and the direction to a GPS located ground reference beacon. Note that vectors are shown in bold.

The purpose of this section is to prove that the Pod's Airborne Platform can determine its own position and attitude in the local earth coordinate system in order to be able to put a "virtual" GPS location on any detected fire hot spot.

Figure 16:
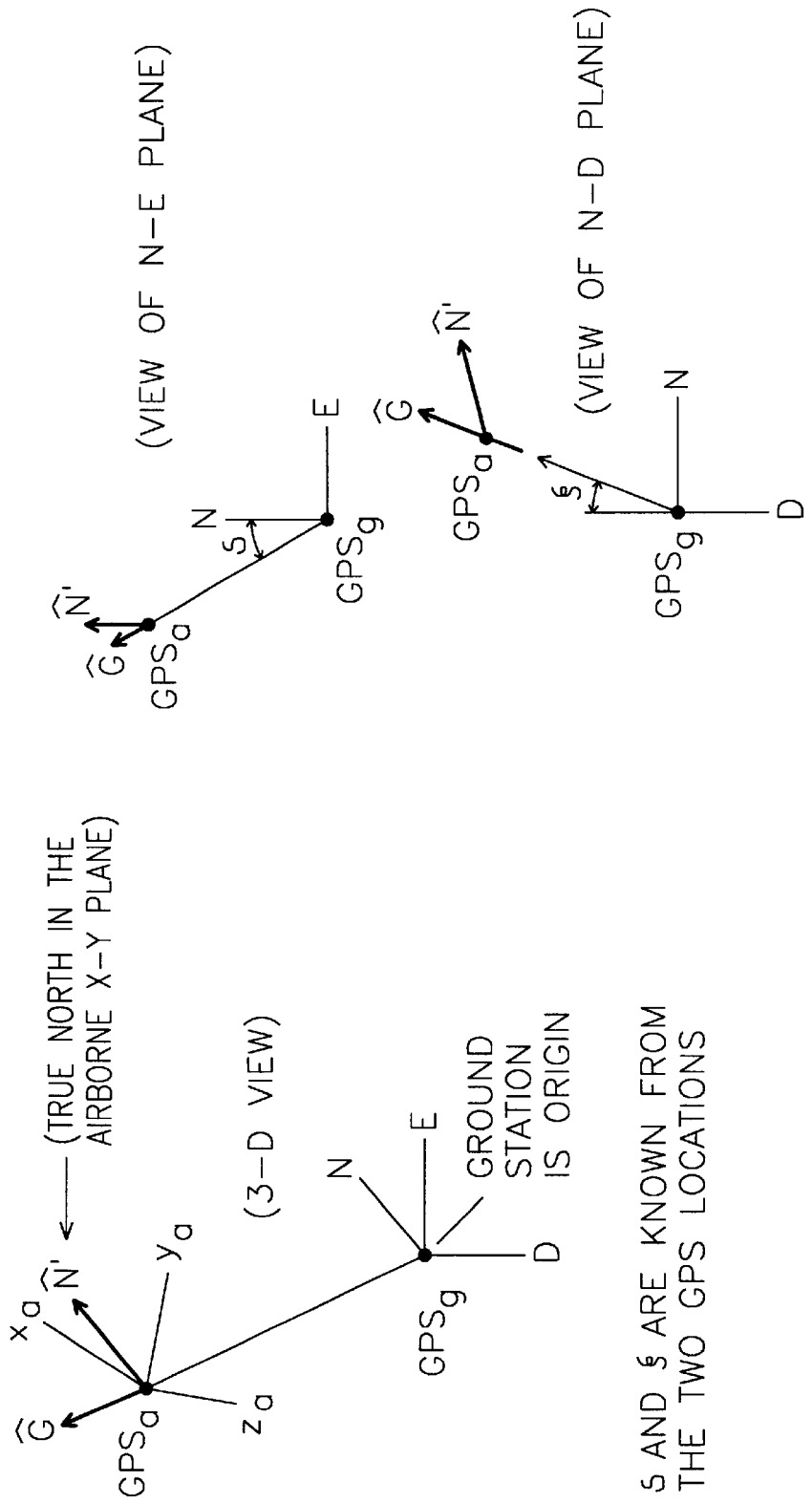
FIG. 16 shows the relationships of airborne platforms to ground stations in the local earth north-east-down (NED) system.
Figure 17:
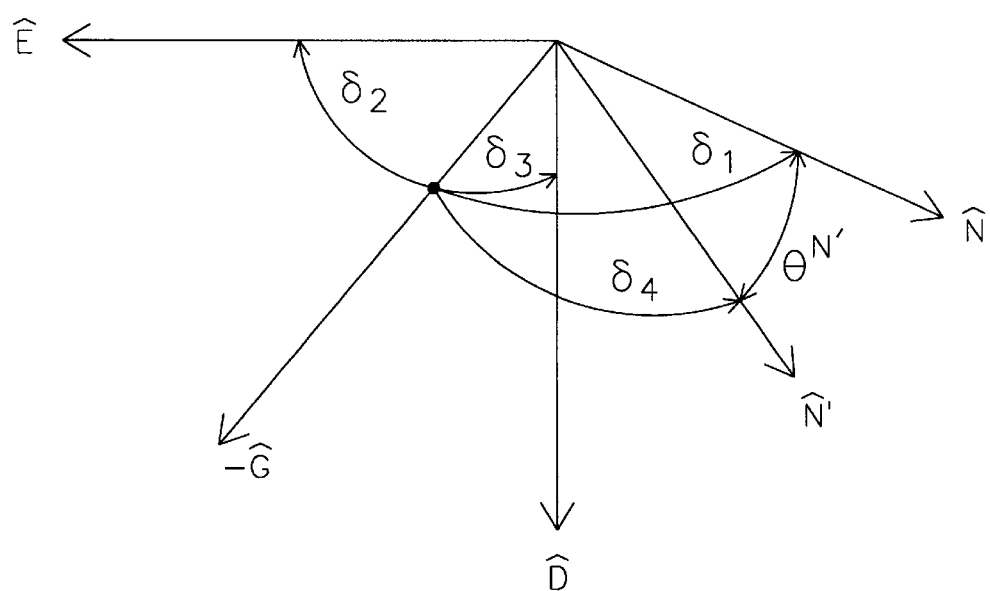
FIG. 17 shows the local NED coordinate system with unit direction vectors to the ground station and unit direction to north in an aircraft x-y plane.

FIG. 16 shows several views of the basic vectors involved in self location of the pod. The 3-D view shows the North-East-Down (N-E-D) right handed orthogonal coordinate system centered at the known location of the Ground Station, $GPS_g$; and the Airborne Platform coordinate system, $X_a Y_a Z_a$, centered at its known location, $GPS_a$. FIG. 17 shows them translated to a single origin for the purpose of determining the attitude of the Platform's x-y-z system in the local earth system (the N-E-D system). The angle that must be determined for this purpose is $\theta^{N'}$ between the N' and N vectors, where N is the direction to true north at the local horizontal, or, N-E plane; and N' is the direction to true north sensed in the Platform's x-y plane. All coordinate systems developed and used in this document are right-handed-orthogonal, and transformations between them are done in the yaw-pitch-roll sequence.

In FIG. 17 an orthogonal coordinate system, known as the N'-G coordinate system, is derived from the two vectors N' and G', which are both defined and known in the Airborne Platform x-y-z coordinate system. G' is the direction to the Ground Station in both the Platform x-y-z coordinate system and in the Ground Station N-E-D coordinate system (where it is known as G, G=G'). N', the sensed true north direction in the x-y plane of the Platform, is therefore defined in the platform x-y-z coordinate system; but it must lie in the N-D plane of the N-E-D coordinate system.

The unit direction vector, G, to the Ground Station from the Airborne Platform, as well as the full position vector between the two, are determined in the N-E-D coordinate system from the difference between the GPS location of the Airborne Platform and the GPS location of the Ground Station (GPSa and GPSg respectively):

$$kG = (\text{latitudes}_A - \text{latitudes}_G) \, N + (\text{longitudes}_G - \text{longitudes}_A) \, E + (\text{altitudes}_G - \text{altitude}_A) \, D \quad (A1)$$

(k is a normalization factor). This computation is made on the Airborne Platform, since the Ground Station can broadcast its true location, along with the difference between its received GPS location ($GPS_g$) and its true location, to the Airborne Platform. The difference data is used to correct the Platform's GPS location ($GPS_a$), known as the differential GPS process.

The value of $\theta^{N'}$, the pitch angle between the N direction and the N' direction is unknown, but is developed in this appendix using information about the G vector, which is defined in both the N-E-D system and the Platform x-y-z system. Regardless of the attitude of the Airborne Platform, the sensed north direction, N', must lie in the N-D plane of the local N-E-D coordinate system. Therefore, the angle $\theta^{N'}$ is a rotation about the E axis of the N-E-D coordinate system. From FIG. 17, the rotation of N about E to become N' is given by the following rotation matrix–vector multiplication:

$$\begin{pmatrix} N'_N \\ N'_E \\ N'_D \end{pmatrix} = \begin{pmatrix} \cos\theta^{N'} & 0 & -\sin\theta^{N'} \\ 0 & 1 & 0 \\ \sin\theta^{N'} & 0 & \cos\theta^{N'} \end{pmatrix} \begin{pmatrix} N_N \\ N_E \\ ND \end{pmatrix} \quad (A2)$$

(vector N' components)  (rotation matrix)  (vector N components)

Since N is the N-axis of the N-E-D coordinate system, then: $N_N=1$, $N_E=0$, and $N_D=0$. Therefore, the components of N in the N-E-D coordinate system become: $N'_N = \cos\theta^{N'}$, $N'_E = 0$, and $N'_D = \sin\theta^{N'}$. Thus, the vector expression for N' is defined in component form as:

$$N' = \cos\theta^{N'} N + 0E + \sin\theta^{N'} D \quad (A3)$$

From FIG. 17 the unit direction vector to the Ground Station, G, derived in equation (A1) above, can be defined in component form in the N-E-D coordinate system as:

$$G = \cos\delta_1 N + \cos\delta_2 E + \cos\delta_3 D \quad (A4)$$

where $\delta_1$, $\delta_2$, and $\delta_3$ are the angles with the N, E, and D axes respectively, as shown in FIG. A-2. Forming the dot product of N' with G, from expressions (A-3) and (A-4) respectively:

$$\cos\delta_4 = \cos\delta_1 \cos\theta^{N'} + 0 + \cos\delta_3 \sin\theta^{N'} \quad (A5)$$

Angle $\delta_4$ between G and N' is known from data onboard the Airborne Platform x-y-z coordinate system and is given by the dot product of G and N' in that system:

$$\cos\delta_4 = G \cdot N' \quad (A6)$$

Equation (A5) is a transcendental equation, which can be solved for the unknown angle $\theta^{N'}$ by numerical techniques. The solution for $\theta^{N'}$ permits defining N' in the N-E-D coordinate system using equation (A3).

The direction cosine matrix between the N-E-D and the N'-G coordinate systems will now be developed. To create the N'-G orthogonal coordinate system, a unit direction vector, $T_1'$ is derived from the cross product of G with N'; these are not perpendicular, hence the sin $\delta_4$ term:

$$T_1' = G \times N' / \sin\delta_4 \quad (A7)$$

Next unit direction vector, $T_2'$, is derived from the cross product of N' with $T_1'$, which are perpendicular:

$$T_2' = N' \times T_1' \tag{A8}$$

The result is the N'-G orthogonal coordinate system defined by the three orthogonal unit vectors N', $T_1'$, and $T_2'$. Since each of these vectors is defined in the N-E-D coordinate system, the direction cosine matrix is given as a 3×3 array of dot products of the respective unit vectors:

$$\begin{matrix} & N\text{-}E\text{-}D \\ \text{To} & = \\ N'\text{-}G & \end{matrix} \begin{matrix} N' \cdot N & N' \cdot E & N' \cdot D \\ T_1' \cdot N & T_1' \cdot E & T_1' \cdot D \\ T_2' \cdot N & T_2' \cdot E & T_2' \cdot D \end{matrix} \tag{A9}$$

The term N'·E is zero, since N' lies in the N-D plane, and is perpendicular to E. The transpose (inverse) of (A9) is used to define an N'-G system vector in the N-E-D system.

Next, the direction cosine matrix relating the N'-G and the Airborne Platform x-y-z coordinate systems will be developed. N' and G are known in the Airborne Platform x-y-z coordinate system. The components of N' in that system are defined as:

$$N' = N'_x x + N'_y y + 0 z \tag{A10}$$

where $N'_x$ and $N'_y$ are sin and cos respectively of the true north heading angle (north=0 reference angle), and x, y, and z are the unit direction vectors defining the x-y-z coordinate axes. $N'_z$, the z-axis component of N', is 0 because the compass is assumed hard mounted to the Airborne Platform's x-y deck. The components of G defined in the Airborne Platform are:

$$G = G_x x + G_y y + G_z z \tag{A11}$$

N' and G are used to form $T_1'$ and $T_2'$, as defined in equations (A7) and (A8). We now use the definitions of N' and G in the Airborne Platform x-y-z coordinate system defined by equations (A10) and (A11), $T_1'$ is expressed in the Platform x-y-z coordinate system as:

$$T_1' = -G_z N'_y / \sin \delta_4 x + G_z N'_x / \sin \delta_4 y + (G_x N'_y G_y N'_x) / \sin \delta_4 z \tag{A12}$$

And $T_2'$ is expressed in the Airborne Platform x-y-z coordinate system as:

$$T_2' = (G_x N'_y{}^2 - G_y N'_x N'_y) / \sin \delta_4 x - (G_y N'_x{}^2 - Gx\ N'_x N'_y) / \sin \delta_4 Y \\ G_z (N'_y{}^2 - N'_y{}^2) / \sin \delta_4 z \tag{A13}$$

Thus the matrix relating the Airborne Platform x-y-z and N'-G coordinate systems is:

$$\begin{matrix} & x\text{-}y\text{-}z \\ \text{To} & = \\ N'\text{-}G & \end{matrix} \begin{matrix} N' \cdot x & N' \cdot y & N' \cdot z \\ T_1' \cdot x & T_1' \cdot y & T_1' \cdot z \\ T_2' \cdot x & T_2' \cdot y & T_2' \cdot z \end{matrix} \tag{A14}$$

Using the Airborne Platform x-y-z component definitions of unit vectors N', $T_1'$, and $T_2'$ (A10, A12 and A13 respectively), the x-y-z-to-N'-G transform matrix (A14) becomes:

$$\begin{matrix} N'_x & N'_y & 0 \\ G_z N'_y / \sin \delta_4 & G_z N'_x / \sin \delta_4 & (G_x N'_y - G_y N'_x)/\sin \delta_4 \\ (G_x N'_y{}^2 - G_y N'_x N'_y)/\sin \delta_4 & (G_y N'_x{}^2 - G x N'_x N'_y)/\sin \delta_4 & G_z (N'_x{}^2 + N'_y{}^2)/\sin \delta_4 \end{matrix} \tag{A15}$$

Thus, when the direction (expressed as unit direction vector $F_a$) to a forest fire hot spot infrared source is detected in the Airborne Platform x-y-z coordinate system, the corresponding unit direction vector in the local N-E-D coordinate system, $F_g{}^a$, can be computed using:

$$F_g{}^a = \begin{matrix} N'\text{-}G \\ \text{To} \\ N\text{-}E\text{-}D \end{matrix} \begin{matrix} x\text{-}y\text{-}z \\ \text{To} \\ N'\text{-}G \end{matrix} F_a \tag{A16}$$

where the [N'-G to N-E-D] matrix is the transpose (inverse) of the (N-E-D-to -N'-G) matrix (A9).

Figure 18:
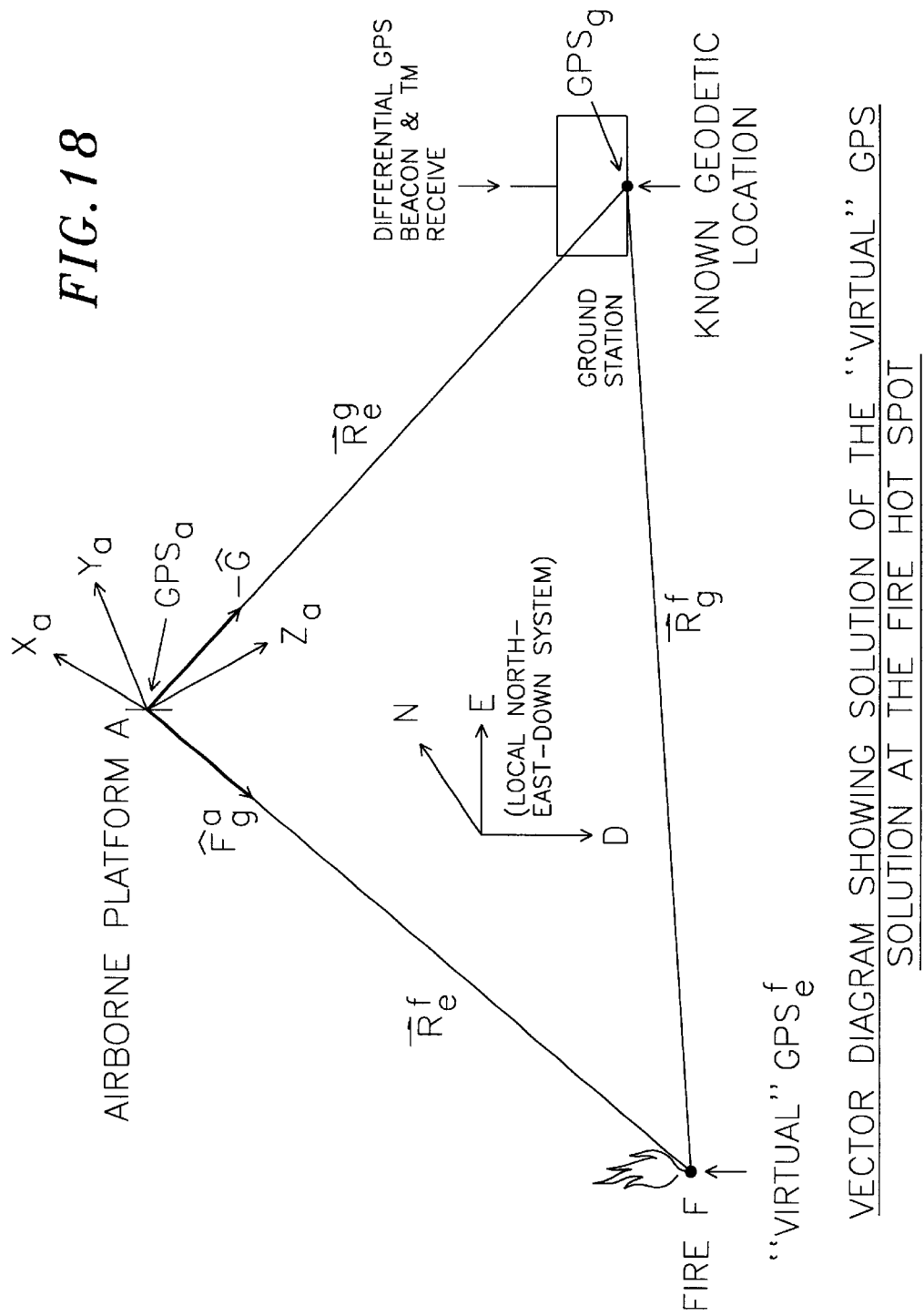
FIG. 18 is a vector diagram showing the solution of the virtual GPS solution at the fire hot spot.

Referring to FIG. 18, the solution of the "Virtual GPS" location of the fire can be made. The position vector $R^g{}_e$ is known in the local N-E-D system from the corrected GPS locations of the Airborne Platform and the Ground Station:

$$R^g{}_e = A \text{ function of} (GPS\ a - GPS\ b) \tag{A17}$$

Or, expressed in component notation (A- 17) becomes:

$$R^g{}_e = (\text{Latitude A} - \text{Latitude G})\ N + (\text{Longitude G} - \text{Longitude A}) \\ E + (\text{Altitude G} - \text{Altitude A})\ D \tag{A18}$$

The unit vector G in FIG. 18 is used to generate the unit direction vector $F_g{}^a$ from the Airborne Platform (but in the local N-E-D system) to the detected fire, as developed above. The triangle shown in FIG. 18 having A (Airborne Platform), F (Fire), and G (Ground Station) at each of its apexes can be solved for the unknown side, $R_g{}^a$, using the law of sines. The included angle at G is determined from the triple vector product of $F_g{}^a$, $R^g{}_e$ and –D. The scalar product of this with $R^g{}_e$ then gives the cosine of the apex angle at G times a constant:

$$\cos(\theta_G) = F_g{}^a \times R^g{}_e \times (-D) \cdot R^g{}_e / (\text{Abs}(F_g{}^a \times R^g{}_e \times (-D)) \times \text{Abs}(R^g{}_e)) \tag{A19}$$

The included angle at A is determined from the dot product of $F_g{}^a$ and $R^g{}_e$ to give the cosine of the apex angle at A times a constant:

$$\cos(\theta_A) = F_g{}^a \cdot R^g{}_e / \text{Abs}(R^g{}_e) \tag{A20}$$

From (A19) and A(20), OF can be determined. Using the law of sines, the magnitude of $R^f{}_g$ in FIG. 18 is computed. Its direction is given by the triple vector product:

$$R^f{}_g = \text{Abs}(R^f{}_g) F_g{}^a \times R^g{}_e (-D) / \text{Abs}(F_g{}^a \times R^g{}_e \times (-D)) \tag{A21}$$

The value of $R^f{}_g$ then provides the "Virtual GPS" location of the fire hot spot relative to the known GPS location of the Ground Station. This information is computed continuously on the Airborne Platform and telemetered to the Ground Station.

The drawings and the foregoing description are not intended to represent the only form of the invention in regard to the details of this construction and manner of operation. In fact, it will be evident to one skilled in the art that modifications and variations may be made without departing from the spirit and scope of the invention. Although specific terms have been employed, they are intended in a generic and descriptive sense only and not for the purpose of limitation.

What is claimed is:

1. An aircraft borne system for detecting and locating forest or other fire spots, vehicles, and other IR emitting sources on a terrain, the system comprising:
   a means for establishing the position of the aircraft borne system within a reference frame; and
   a means for scanning terrain and receiving and measuring IR emitting source photons and determining the position of the IR emitting source relative to the aircraft borne system by determining position vectors from the aircraft borne system to the IR emitting sources which comprises a rotating optics head containing a rotating and nutating mirror contained in a spinner rotationally mounted to a pod which scans the terrain and reflects the IR photons to a photon detector.

2. The aircraft borne system of claim 1, wherein the means for establishing the position of the aircraft borne system within a reference frame, and the means for scanning terrain and receiving and measuring IR emitting source photons and determining the position of the IR emitting source relative to the aircraft borne system are contained in a pod detectably carried by an aircraft.

3. The aircraft borne system of claim 2, wherein the pod is self-contained and needs no power from the aircraft.

4. The aircraft borne system of claim 1, wherein the means for establishing the position of the aircraft borne system within the reference frame comprises a global positioning system.

5. The aircraft borne system of claim 4, wherein the means for establishing the position of the aircraft borne system within the reference frame further comprises an altimeter.

6. The aircraft borne system of claim 5, wherein the altimeter comprises one of a radio altimeter, a corrected precision barometric altimeter, or a GPS that gives vertical position plus a pre-set reference to a reference ground altitude.

7. The aircraft borne system of claim 1, wherein the means for establishing the position of the aircraft borne system within the reference frame further comprises means for determining the system's attitude.

8. The aircraft borne system of claim 7, wherein the means for determining the system's attitude comprises one of an inertial measurement means, and a radio direction finding means.

9. The aircraft borne system of claim 1, wherein the means for scanning terrain and receiving and measuring IR emitting source photons and determining the position of the IR emitting source relative to the aircraft borne system further comprises an optical angle encoder which reads the rotation angle position of the mirror and a nutation angle reader to determine a directional vector from the aircraft borne system to the IR source.

10. The aircraft borne system of claim 9, wherein the nutation angle reader comprises a laser and a linear array of CCDs.

11. The aircraft borne system of claim 1, wherein the spinner has a propeller and is slipstream driven to rotate the spinner and in turn the optics head.

12. The aircraft borne system of claim 2, further comprising telemetry means for providing communication between the pod and a ground station.

13. The aircraft borne system of claim 12, further comprising a video camera and an IR camera which can be commanded from the ground station to pan and zoom via an onboard camera control unit.

14. The aircraft borne system of claim 1, wherein the means for scanning terrain and receiving and measuring IR emitting source photons and determining the position of the IR emitting source relative to the aircraft borne system further characterizes the IR emitting source target as to intensity and spectrum.

15. The aircraft borne system of claim 2, wherein the means for determining the position of the IR emitting source relative to the pod comprises means to compute the target location using the pod's GPS location data, IMU attitude data with respect to local North East Down coordinate frame which also determines true North, and the pod's altitude above ground determined by map memory ground elevation data matched to the pod's real time GPS coordinates.

16. A system for detecting and locating forest or other fire spots, vehicles, and other IR emitting sources on a terrain, the system comprising:
   (a) a self-contained pod that is detachably attachable to an aircraft and does not need power from the aircraft, the pod having
      a means for establishing the position of the aircraft borne system within in a reference frame comprising a GPS, an altimeter, and means for determining the pod's attitude,
      a means for scanning terrain and receiving and measuring IR emitting source photons and determining the position of the IR emitting source relative to the aircraft borne system, comprising a rotating optics head containing a rotating and nutating mirror which scans the terrain and reflects the IR photons to a photon detector, an optical angle encoder which reads the rotation angle position of the mirror, and a nutation angle reader to determine a directional vector from the aircraft borne system to the IR source, and telemetry means; and
   (b) a ground station with telemetry means for communication with the telemetry means of the self-contained pod.

17. The system of claim 16, wherein the nutation angle reader comprises a laser and a linear array of CCDs.

18. The system of claim 17, wherein the mirror is contained in a spinner rotationally mounted to a pod.

19. The system of claim 18, further comprising a video camera and an IR camera which can be commanded from the ground station to pan and zoom via an onboard camera control unit.

20. The system of claim 16, wherein the means for scanning terrain and receiving and measuring IR emitting source photons and determining the position of the IR emitting source relative to the aircraft borne system further characterizes the IR emitting source target as to intensity and spectrum.

21. The system of claim 16, the ground station pre-filters incoming telemetry from the pod on a map for ground station operator use, and the ground station includes a transceiver to communicate via a relay transceiver on the pod set to communicate with ground units at or closing in to the IR source.

22. The system of claim 21, wherein the ground station further includes an operator alarm triggered by a pre-set fire intensity and temperature level received from the pod telemetry.

23. The system of claim 21, wherein the ground station further includes archival recording of voice, telemetry/map display, video downlink which can be shared with other users.

24. The system of claim 21, wherein the means for determining the position of the IR emitting source relative to the pod comprises means to compute the target location using the pod's GPS location data, IMU attitude data with respect to local North East Down coordinate frame which also determines true North, and the pod's altitude above ground determined by map memory ground elevation data matched to the pod's real time GPS coordinates.

25. The system of claim 21, further including satellite relay capability on the pod and the ground station for transmission of all downlink video and telemetry plus uplink commands to the pod plus relay voice/data communications from the ground station via the pod to the ground units.

26. The system of claim 16, wherein the means for determining the position of the IR emitting source relative to the pod comprises means to compute the target location using the pod's GPS location data, a radio direction finder to determine a vector to a fixed beacon at a ground based location or a geosynchronous satellite and compass to determine true north, and the pod's altitude above ground determined by map memory ground elevation data matched to the pod's real time GPS coordinates.

27. The system of claim 16, wherein the aircraft is a remotely piloted vehicle.

28. An aircraft borne system for detecting and locating forest or other fire spots, vehicles, and other IR emitting sources on a terrain, the system comprising:

a means for establishing the position of the aircraft borne system within a reference frame;

a means for scanning terrain and receiving and measuring IR emitting source photons and determining the position of the IR emitting source relative to the aircraft borne system by determining position vectors from the aircraft borne system to the IR emitting sources; and telemetry means for providing communication between the pod and a ground station; and a video camera and an IR camera which can be commanded from the ground station to pan and zoom via an onboard camera control unit wherein the means for establishing the position of the aircraft borne system within a reference frame, the means for scanning terrain and receiving and measuring IR emitting source photons and determining the position of the IR emitting source relative to the aircraft borne system, telemetry means, and video camera and IR camera are contained in a pod detectably carried by an aircraft.

* * * * *